(12) United States Patent
Matsumura et al.

(10) Patent No.: US 9,660,238 B2
(45) Date of Patent: May 23, 2017

(54) SLURRY FOR SECONDARY BATTERY POROUS MEMBRANE, A SECONDARY BATTERY POROUS MEMBRANE, AN ELECTRODE FOR SECONDARY BATTERY, A SEPARATOR FOR SECONDARY BATTERY AND A SECONDARY BATTERY

(75) Inventors: Taku Matsumura, Yokohama (JP); Takuya Kaneda, Kawasaki (JP); Yasuhiro Wakizaka, Yokohama (JP)

(73) Assignee: Zeon Corporation, Tokyo (JP)

( * ) Notice: Subject to any disclaimer, the term of this patent is extended or adjusted under 35 U.S.C. 154(b) by 553 days.

(21) Appl. No.: 13/878,095

(22) PCT Filed: Oct. 7, 2011

(86) PCT No.: PCT/JP2011/073228
§ 371 (c)(1),
(2), (4) Date: Jul. 2, 2013

(87) PCT Pub. No.: WO2012/046843
PCT Pub. Date: Apr. 12, 2012

(65) Prior Publication Data
US 2013/0273421 A1    Oct. 17, 2013

(30) Foreign Application Priority Data
Oct. 7, 2010  (JP) ................................ 2010-227597

(51) Int. Cl.
| | | |
|---|---|---|
| H01M 2/16 | (2006.01) | |
| H01M 4/13 | (2010.01) | |
| H01M 4/62 | (2006.01) | |
| C08L 33/20 | (2006.01) | |
| H01M 10/052 | (2010.01) | |
| H01M 10/42 | (2006.01) | |

(52) U.S. Cl.
CPC ........... *H01M 2/1653* (2013.01); *C08L 33/20* (2013.01); *H01M 2/168* (2013.01); *H01M 4/13* (2013.01); *H01M 4/622* (2013.01); *H01M 10/052* (2013.01); *H01M 10/4235* (2013.01)

(58) Field of Classification Search
CPC ...................................................... H01M 2/14
See application file for complete search history.

(56) References Cited

U.S. PATENT DOCUMENTS

| | | | |
|---|---|---|---|
| 6,730,440 B1 * | 5/2004 | Bauer et al. ................... | 429/249 |
| 2011/0052987 A1 | 3/2011 | Katayama et al. | |
| 2011/0318630 A1 * | 12/2011 | Wakizaka ........... | H01M 2/1653 |
| | | | 429/144 |

FOREIGN PATENT DOCUMENTS

| | | |
|---|---|---|
| JO | 2011-60701 A | 3/2011 |
| JP | 11-204098 A | 7/1999 |
| JP | 2000-149906 A | 5/2000 |
| JP | 2007-311151 A | 11/2007 |
| JP | 2007311151 A * | 11/2007 |
| WO | WO 2009/044741 A1 | 4/2009 |
| WO | WO 2010/024328 A1 | 3/2010 |
| WO | WO 2010/074202 A1 | 7/2010 |
| WO | WO 2010/098380 A1 | 9/2010 |

OTHER PUBLICATIONS

WO 2010074202.*
International Preliminary Report on Patentability and Written Opinion of the International Searching Authority (Forms PCT/IB/338, PCT/IB/373 and PCT/ISA/237) for International Application No. PCT/JP2011/073228, mailed May 16, 2013.
International Search Report issued in PCT/JP2011/073228 mailed Jan. 10, 2012.

* cited by examiner

Primary Examiner — Ula C Ruddock
Assistant Examiner — Gregory Passa
(74) Attorney, Agent, or Firm — Birch, Stewart, Kolasch & Birch, LLP

(57) ABSTRACT

A secondary battery porous membrane, manufactured by a slurry for secondary battery porous membrane, which is superior in coating priority and dispersibility of non-conductive organic particles, which improves cycle characteristic of the obtained secondary battery, which has high flexibility and can prevent powder falls, and which has less content of moisture amount; and non-conductive organic particles, which can be suitably used as a secondary battery porous membrane and has less content of metallic foreign particles. The slurry for secondary battery porous membrane comprises; a binder including a polymerized unit of vinyl monomer having a hydrophilic acid group, a non-conductive organic particle having a functional group, cross-linkable with the hydrophilic acid group and a solvent.

19 Claims, No Drawings

SLURRY FOR SECONDARY BATTERY POROUS MEMBRANE, A SECONDARY BATTERY POROUS MEMBRANE, AN ELECTRODE FOR SECONDARY BATTERY, A SEPARATOR FOR SECONDARY BATTERY AND A SECONDARY BATTERY

TECHNICAL FIELD

The present invention relates to a slurry for secondary battery porous membrane, for more detail, to a slurry for secondary battery porous membrane for manufacturing a secondary battery porous membrane, which is formed on the surface of electrode or separator of a lithium ion secondary battery, having high flexibility and can contribute to an improvement of battery cycle characteristic. The present invention further relates to an electrode for secondary battery, a separator for secondary battery and a secondary battery, respectively having the secondary battery porous membrane.

BACKGROUND ART

Among batteries in practical use, a lithium ion secondary battery shows the highest energetic density; and it is commonly used for a small electronics. Further, in addition to a compact application, an application for cars is also expected. Among them, a longer-life and further improvement for safety of a lithium ion secondary battery are demanded.

As a lithium ion secondary battery, in general, a polyolefin series organic separator, such as polyethylene, polypropylene, etc., is used in order to prevent a short circuit between positive electrode and negative electrode. Polyolefin series organic separator has a physical property, which melts at 200° C. or less. Thus, when battery has a high temperature due to its inner or outer stimulation, the organic separator may shrink or melt, causing volume change of an organic separator. As a result, an explosion and the like may occur due to short circuits of positive and negative electrodes, an electrical energy emission and the like.

In order to solve a problem, caused by the use of such polyolefin series organic separator, a layer comprising non-conductive particles such as inorganic particles is proposed to stack on polyolefin series organic separator or on electrode (positive electrode or negative electrode). Further, in order to prevent thermal runaway caused by unusual reaction of a battery, a porous membrane, including polymer particles which melt by heat or which degree of swelling to electrolytic solution increase by heat, is proposed. In case when a temperature of a secondary battery abnormally rises, such as by a short circuit, fine holes in a porous membrane are obstructed by melting and swelling the polymer particles; and thus, ion conduction between electrodes is prevented, electrode is interrupted and it is believed to have a function to prevent further rise in temperature (a shutdown function).

For instance, Patent Article 1 describes a porous membrane comprising heat resistant resin fine particles and organic fine particles having said shutdown function, in order to improve its safety. Further, it is described to use an ethylene vinyl acetate polymer as binder for a porous membrane.

Patent Article 2 describes an improvement in powder falls of non-conductive particles from a porous membrane, by using water-dispersible acrylic polymer particles having a hydrophilic group, such as sulfonic acid. In addition, the article describes a strong and flexible porous membrane can be provided by further including a crosslinkable group in the water-dispersible acrylic polymer particles.

Patent Article 3 describes a porous membrane, in which alumina or titania is used as an inorganic filler, and polyvinyl alcohol or styrene-butadiene copolymer is used as a binder.

PRIOR ARTS

Patent Article 1: Japanese Patent Laid-Open No. 2006-139978
Patent Article 2: International Patent Publication WO2009/123168
Patent Article 3: Japanese Patent Laid-Open No. 2008-210794

SUMMARY OF THE INVENTION

Technical Problems

However, according to a review of the present inventors, porous membrane of Patent Article 1 uses an ethylene-vinylacetate polymer as a binder; and that dispersibility of heat resistant resin fine particles and organic fine particles is not sufficient, which is inferior in uniformity of a porous membrane. As a result, there was a case when flexibility of a porous membrane is deteriorated. Further, when ethylene-vinylacetate polymer is used as a binder, binding priority between heat resistant resin fine particles and organic fine particles cannot be sufficiently maintained; and the fine particles may be removed (powder falls) from the porous membrane.

According to the porous membrane of Patent Article 2, although dispersibility of non-conductive particles in a porous membrane slurry is superior, when a hydrophilic group and a crosslinkable group are included in a binder of acrylic polymer particles, it was confirmed that a cross-linkage reaction tends to occur during slurry production step since the functional groups mutually react. Therefore, coating priority of slurry becomes instability with time; consequently, there was a time when flexibility of the porous membrane becomes insufficient.

According to the porous membrane of Patent Article 3, battery characteristic may be lowered, caused by a side reaction of moisture included in the porous membrane occurred in the battery, and further by an ion elution of metallic foreign particles included in an inorganic filler occurred in the battery.

Thus, an object of the present invention is to provide a secondary battery porous membrane, manufactured by a slurry for secondary battery porous membrane, which is superior in coating priority and dispersibility of non-conductive organic particles, which improves cycle characteristic of the obtained secondary battery, which has high flexibility and can prevent powder falls, and which has less content of moisture amount. Further, an object is to provide non-conductive organic particles, which can be suitably used as a secondary battery porous membrane and has less content of metallic foreign particles.

Therefore, after consideration of the present inventors, a porous membrane superior in flexibility and powder fall property can be obtained by using a specific binder and specific non-conductive organic particles. Namely, by using a specific binder and specific non-conductive organic particles, a cross-linkage reaction during slurry manufacturing steps can be prevented; and that slurry viscosity and the like can be lowered. Therefore, dispersibility of non-conductive organic particles in porous membrane slurry and coating priority of a porous membrane slurry can be improved; and a porous membrane with high flexibility can be obtained. Further, a cross-linkage structure is formed between a binder and non-conductive organic particles of the present invention; and that binding priority of a binder and non-conductive organic particles becomes good, which prevents removal (powder falls) of non-conductive organic particles from a porous membrane. In addition, with non-conductive organic particles of the present invention, ion elution derived from inorganic filler cannot be seen and battery characteristic is not deteriorated with less moisture content of a porous membrane. Furthermore, the present inventors have found that, by improving dispersibility of non-conductive organic particles in porous membrane slurry and coating priority of the porous membrane slurry, a cycle characteristic of a secondary battery using the porous membrane, in addition to productivity of the porous membrane, improve.

Solution to Problem

The summary of the present invention for the purpose of solving the above problem is as follows.

(1) A slurry for secondary battery porous membrane comprising
a binder including a polymerized unit of vinyl monomer having a hydrophilic acid group,
a non-conductive organic particle having a functional group, which is cross-linkable with the hydrophilic acid group and a solvent.

(2) The slurry for secondary battery porous membrane as set forth in the above (1), wherein the binder further includes a polymerized unit of (meth)acrylic ester monomer and a polymerized unit of α,β-unsaturated nitrile monomer;
and in a total polymerized unit,
a content ratio of the polymerized unit of vinyl monomer having a hydrophilic acid group is 0.1 to 10 wt %,
the same of (meth)acrylic ester monomer is 50 to 98 wt %, and
the same of α,β-unsaturated nitrile monomer is 1.0 to 50 wt %.

(3) The slurry for secondary battery porous membrane as set forth in the above (1) or (2), wherein the hydrophilic acid group is a sulfonic acid group or a phosphoric acid group.

(4) The slurry for secondary battery porous membrane as set forth in any one of the above (1) to (3), wherein the functional group, which is cross-linkable with the hydrophilic acid group, is an epoxy group or an alkoxysilane group.

(5) The slurry for secondary battery porous membrane as set forth in any one of the above (1) to (4), wherein
an average particle diameter of the non-conductive organic particle is 0.1 to 2.0 μm, and
a temperature in which weight reduction ratio of the non-conductive organic particle reaches 10 wt % is 250° C. or more, when heated at a temperature rising rate of 10° C./min. by a thermobalance under a nitrogen atmosphere.

(6) The slurry for secondary battery porous membrane as set forth in any one of the above (1) to (5), wherein a content of the functional group, which is cross-linkable with the hydrophilic acid group, with respect to the non-conductive organic particle is 0.008 to 0.240 mmol/g.

(7) A secondary battery porous membrane obtained by forming a membrane with the slurry for secondary battery porous membrane as set forth in any one of the above (1) to (6) and drying the same.

(8) A secondary battery porous membrane comprising
a binder, including a polymerized unit of vinyl monomer having a hydrophilic acid group, and
a non-conductive organic particle having a functional group, which is cross-linkable with the hydrophilic acid group, wherein
a cross-linkage structure is formed between the binder and the non-conductive organic particle.

(9) An electrode for secondary battery comprising
an current collector,
an electrode active material layer, including an electrode active material and a binder for electrode, which is adhered to the current collector, and
the secondary battery porous membrane as set forth in the above (7) or (8), stacked on a surface of the electrode active material layer.

(10) A separator for secondary battery comprising
an organic separator and
the secondary battery porous membrane as set forth in the above (7) or (8), stacked on the organic separator.

(11) A secondary battery comprising a positive electrode, a negative electrode, an organic separator and an electrolytic solution, wherein the secondary battery porous membrane as set forth in the above (7) or (8) is stacked on one of the positive electrode, the negative electrode or the organic separator.

Effects of Invention

According to the present invention, by including binder with specific composition and specific non-conductive organic particles, its flexibility and powder fall property become superior; and that a slurry for secondary battery porous membrane for manufacturing a secondary battery porous membrane which can contribute to an improvement of cycle characteristic of a secondary battery. Further, dispersibility and coating priority of the porous membrane slurry are superior. Furthermore, a secondary battery porous membrane manufactured by the porous membrane slurry has less water content, and that its battery characteristic will not deteriorate. In addition, removal of electrode active materials can be prevented by stacking the porous membrane on electrode surface. And in addition, non-conductive organic particles with no metal ion elution in a secondary battery are provided.

DESCRIPTION OF EMBODIMENTS

Here, (1) a slurry for secondary battery porous membrane, (2) a secondary battery porous membrane, (3) an electrode for secondary battery, (4) a separator for secondary battery and (5) a secondary battery according to the present invention will be described in this order.

(1) A Slurry for Secondary Battery Porous Membrane

A slurry for secondary battery porous membrane (hereinafter, may be described as "a porous membrane slurry") of the present invention is a slurry for forming the below-mentioned secondary battery porous membrane. A porous membrane slurry includes a binder of specific composition and a specific non-conductive organic particles, in which solid contents, the binder, the non-conductive organic particles and arbitrary composition, are uniformly dispersed in a solvent.

(Binder)

Binder according to the present invention is a polymer particle with binding priority including polymerized unit of vinyl monomer having a hydrophilic acid group. According to the present invention, by using a binder including polymerized unit of vinyl monomer having a hydrophilic acid group, good binding priority can be provided to said binder, and improves reactivity with the below-mentioned non-conductive organic particles. As a result, a porous membrane with high binding priority and less powder falls can be obtained; and cycle characteristic of a secondary battery using the porous membrane can be improved. In the present invention, "hydrophilic acid group" is a functional group detaching proton in aqueous solvent and its salt.

As for the hydrophilic acid group, carboxyl group, sulfonic acid group, phosphate group and the like are exemplified. Among all, sulfonic acid group or phosphate group is preferable and sulfonic acid group is the most preferable, since reactivity with functional groups in the below-mentioned non-conductive organic particle is high and dispersibility of non-conductive organic particles when manufacturing porous membrane slurry is high. Note that the hydrophilic acid group maybe one kind, or maybe two or more kinds.

Examples of vinyl monomer having carboxyl group include monocarboxylic acid, dicarboxylic acid, dicarboxylic acid anhydride, their derivatives and the like.

Examples of the monocarboxylic acid include acrylic acid, methacrylic acid, crotonic acid, 2-ethylacrylic acid, isocrotonic acid, α-acetoxyacrylic acid, β-trans-aryloxy-acrylic acid, α-chloro-β-E-methoxyacrylic acid, β-diaminoacrylic acid and the like.

Examples of the dicarboxylic acid include maleic acid, fumaric acid, itaconic acid, methyl maleate, dimethyl maleate, phenyl maleate, chloromaleate, dichloromaleate and fluoromaleate and the like.

Examples of the dicarboxylic acid anhydride include maleic anhydride, acrylic anhydride, methymaleic anhydride, dimethymaleic anhydride and the like.

Examples of the dicarboxylic acid derivative include ester maleate such as methylallyl maleate, diphenyl maleate, nonyl maleate, decyl maleate, dodecyl maleate, octadecyl maleate, fluoroalkyl maleate and the like.

Examples of vinyl monomer having sulfonic acid group include vinyl sulfonic acid, methylinyl sulfonic acid, (meth) allylsulfonic acid, styrene sulfonate, (meth)acrylic acid-2-ethyl sulfonate, 2-acrylamide-2-methylpropanesulfonic acid, 3-allyloxy-2-hydroxypropane sulfonic acid and the like.

Examples of vinyl monomer having phosphate group include phosphate-2-(meth)acryloyloxyethyl, phosphate methyl-2-(meth)acryloyloxyethyl, phosphate ethyl(meth) acryloyloxyethyl and the like.

A content ratio of polymerized unit of vinyl monomer having hydrophilic acid group in a total polymerized unit of a binder is preferably 0.1 to 10 wt %, more preferably 0.3 to 7 wt % and the most preferably 0.5 to 5 wt %. When the content ratio of the polymerized unit of vinyl monomer having hydrophilic acid group in a total polymerized unit of a binder is adjusted within the above range, reactivity with the below-mentioned non-conductive organic particles improves, and that dispersing stability of non-conductive organic particles in porous membrane slurry becomes superior. Further, binding priority of the binder improves, and that removal (powder falls) of non-conductive organic particles from porous membrane can be prevented. As a result, cycle characteristic of a secondary battery can be improved.

According to the present invention, binder is preferable to further include polymerized unit of (meth)acrylic ester monomer. When a binder includes polymerized unit of (meth)acrylic ester monomer, said binder does not elute to electrolytic solution of a secondary battery and shows moderate swelling property to electrolytic solution; and that conductivity of lithium ion can be managed. As a result, cycle characteristic of a secondary battery can be improved.

A content ratio of polymerized unit of (meth)acrylic ester monomer in a total polymerized unit of a binder is preferably 50 to 98 wt %, more preferably 60 to 97.5 wt % and the most preferably 65 to 95 wt %. When a content ratio of the (meth)acrylic ester monomer in a total polymerized unit of a binder is adjusted within the above range, mobility of polymers can be suitably maintained; thus, dispersing stability of non-conductive organic particles and flexibility of porous membrane improve. Further, cycle characteristic of a secondary battery can also be improved.

Examples of the (meth)acrylic ester monomer include alkyl ester acrylate such as methyl acrylate, ethylacrylate, n-propylacrylate, isopropylacrylate, n-butylacrylate, t-butylacrylate, pentylacrylate, hexylacrylate, heptylacrylate, octylacrylat, 2-ethylhexyl acrylate, nonylacrylate, decylacrylate, laurylacrylate, n-tetradecylacrylate, stearylacrylate and the like, and methacrylic acid alkyl ester such as methylmethacrylate, ethylmethacrylate, n-propylmethacrylate, isopropylmethacrylate, n-butylmethacrylate, t-butylmethacrylate, pentylmethacrylate, hexylmethacrylate, heptylmethacrylate, octylmethacrylate, 2-ethylhexylmethacrylate, nonylmethacrylate, decylmethacrylate, laurylmethacrylate, n-tetradecylmethacrylate, stearylmethacrylate and the like. Among all, ethyl(meth) acrylate, n-butyl(meth)acrylate, 2-ethylhexyl(meth)acrylate and lauryl(meth)acrylate, having carbon number of alkyl group bonded to none-carbonyl oxygen atom of 2 to 13, are preferable; and n-butyl(meth)acrylate and 2-ethylhexyl (meth)acrylate, having carbon number of alkyl group bonded to none-carbonyl oxygen atom of 4 to 10, are more preferable. This is because these do not elute to electrolytic solution, and show conductivity of lithium ion by moderate swelling to electrolytic solution; and in addition, a cross-link aggregation of the polymer hardly occurs when dispersing non-conductive organic particles.

In addition, binder of the invention is preferable to further include polymerized unit of α,β-unsaturated nitrile monomer. By including the polymerized unit of α,β-unsaturated nitrile monomer, strength of the binder improves.

A content ratio of polymerized unit of α,β-unsaturated nitrile monomer in a total polymerized unit of binder is preferably 1.0 to 50 wt %, more preferably 2.5 to 40 wt % and the most preferably 5 to 35 wt %. When the content ratio of the polymerized unit of α,β-unsaturated nitrile monomer in a total polymerized unit of binder is adjusted within the above range, mobility of a polymer can be suitably maintained; and dispersing stability of non-conductive organic particles and flexibility of a porous membrane improve. Further, cycle characteristic of a secondary battery can be improved.

The α,β-unsaturated nitrile monomers exemplify acrylonitril or methacrylonitrile.

Further, binder of the present invention is preferable to include, in addition to the above-mentioned polymerized units (namely, polymerized unit of vinyl monomer having a hydrophilic acid group, the same of (meth)acrylic ester monomer and the same of α,β-unsaturated nitrile monomer), the other polymerized unit copolymerizable with the above-mentioned polymerized units. Content ratio of the other polymerized unit in a total polymerized unit of binder is preferably 0.1 to 10 wt %, more preferably 0.1 to 5 wt %. When a content ratio of the other polymerized unit in a total polymerized unit of binder is adjusted within the above range, dispersibility of non-conductive organic particles does not decrease and a uniform porous membrane can be formed.

Monomers (the other monomers) constituting the other polymerized unit exemplify styrene series monomers such as styrene, chlorostyrene, vinyltoluene, t-butylstyrene, vinylbenzoate, vinylbenzoatemethyl, vinylnaphthalene, chloromethylstyrene, α-methylstyrene, divinylbenzen and the like, olefin such as ethylene, propylene and the like, diene series monomers such as butadiene, isoprene and the like, halogen atom containing monomers such as vinyl chloride, vinylidene chloride and the like, vinyl esters such as vinyl acetate, propionate vinyl, butyrate vinyl and the like, vinyl ethers such as methylvinyl ether, ethylvinyl ether, butylvinyl ether and the like, vinyl ketons such as methylvinyl ketone, ethylvinyl ketone, butylvinyl ketone, hexylvinyl ketone, isopropenyl vinyl ketone and the like, heterocycle containing vinyl compounds such as N-vinyl pyrolidone, vinyl pyridine, vinyl imidazole and the like, amide series monomer such as acrylamide and the like. Note that the binder may include the other polymerized unit of a kind, or a combination of two or more kinds in an arbitrary ratio.

Binder of the invention is used in a dispersed liquid state dispersed in disperse media (water or organic solvent) or in a solution state dissolved in the solution (hereinafter, they are collectively described as "binder disperse liquid"). In the invention, water is preferably used as the disperse media since they are superior in view of environmental standpoint, and fast drying rate. Further, when organic solvents are used as disperse media, organic solvents such as N-methylpyrrolidone (NMP) and the like are used.

When binder is dispersed in a particle state in dispersed media, average particle diameter of binder which is dispersed in a particle state (a dispersed particle diameter) is preferably 50 to 500 nm, more preferably 70 to 400 nm, and the most preferably 100 to 250 nm. When average particle diameter of binder is within the above range, strength and flexibility of second electrode become superior.

When binder is dispersed in a particle state in dispersed media, solid content concentration of the dispersed liquid is generally 15 to 70 wt %, preferably 20 to 65 wt %, and more preferably 30 to 60 wt %. Workability when manufacturing porous membrane slurry is good, when solid content concentration is within the above range.

Glass-transition temperature (Tg) of binder according to the present invention is preferably −50 to 25° C., more preferably −45 to 15° C. and the most preferably −40 to 5° C. When Tg of the binder is within the above range, porous membrane of the invention show superior strength and flexibility; and that power output characteristic of a secondary battery using said porous membrane can be improved. Note that glass-transition temperature of the binder can be adjusted by combining various monomers.

Manufacturing method of a polymer, binder of the invention, is not particularly limited; and any methods including a solution polymerization method, a suspension polymerization method, a massive polymerization method, an emulsifying polymerization method and the like can be used. Any reaction including ion polymerization, radical polymerization, living radical polymerization and the like can be used. Polymeric initiator used for the polymerization exemplify organic peroxides, such as lauroyl peroxide, diisopropylperoxydicarbonate, di-2-ethylhexyl peroxydicarbonate, t-butyl peroxypivalate, 3,3,5-trimethylhexanoyl peroxide, azo compounds such as α, α'-azobisisobutyronitrile, ammonium persulfate or potassium persulfate.

Binder of the invention is preferably obtained after a particle state metal removing step, wherein particle state metals included in the binder disperse liquid are removed during binder manufacturing step. When content of particle state metal component included in binder is 10 ppm or less, metal ion cross-linkage between polymers in a porous membrane slurry with time can be prevented, and thus its viscosity increase can be prevented. Further, there is a less concern for an increase of self-discharge by inner short circuit or by dissolution•deposition when charging in a secondary battery; and that cycle characteristic or safetyness of battery improve.

A removing method in which metal components are removed from binder disperse liquid in the particle state metal removing step is not particularly limited; and a filtration removing method using a filtration filter, a removing method using a vibrating screen, a removing method by a centrifugal separation, a removing method using magnetic force and the like are exemplified. Among all, the removing method using magnetic force is preferable, since removing objects are metal components. Although the removing method using magnetic force is not particularly limited as long as metal components can be removed, it is preferably performed by placing a magnetic filter in manufacturing line of the binder when considering its productivity and removal efficiency.

Dispersant, used in the above-mentioned polymerization method during manufacturing step of a binder used in the invention, can be any used in a general synthesis; and its specific examples are benzene sulfonate such as sodium dodecylbenzene sulfonate, sodium dodecylphenylether sulfonate and the like, alkyl sulfate such as sodium lauryl sulfate, sodium tetradodecyl sulfate and the like, sulfosuccinate such as dioctyl sodium sulfosuccinate, dihexyl sodium sulfosuccinate and the like, fatty acid salt such as sodium laurate, ethoxysulfate salt such as sodium polyoxyethylene laurylether sulfate salt, sodium polyoxyethylene nonylphenylether sulfate salt and the like, alkanesulfonate, sodium alkylether phosphate ester salt, non-ionic emulsifier such as polyoxyethylenenonylphenyl ether, polyoxyethylenesorbitanlaurylester, polyoxyethylene-polyoxypropylene block copolymer and the like, and water-soluble polymer such as gelatin, maleic anhydride-styrene copolymer, polyvinylpyrolidone, sodium polyacrylate, polyvinyl alcohol, having 700 or more of polymerization degree and 75% or more of saponification degree, and the like. These can be used alone or a combination of two or more. Among them, benzene sulfonate such as sodium dodecylbenzene sulfonate, sodium dodecylphenylether sulfonate and the like and alkyl sulfate such as sodium lauryl sulfate, sodium tetradodecyl sulfate and the like are preferable; and benzene sulfonate such as sodium dodecylbenzene sulfonate, sodium dodecylphenylether sulfonate and the like are more preferable due to their superiority in oxidation resistivity. Additional amount of the dispersant can arbitrary be set, and it is generally around 0.01 to 10 parts by weight with respect to the total amount of 100 parts by weight of monomer.

"pH" of binder according to the invention when dispersed in a disperse media is preferably 5 to 13, more preferably 5 to 12 and the most preferably 10 to 12. When "pH" of binder is within the above range, its preservation stability improves, and its mechanical stability further improves.

Examples of pH adjuster, adjusting pH of binders, are hydroxide including alkali metal hydroxide such as lithium hydroxide, sodium hydroxide, potassium hydroxide and the like, alkali earth metal oxide such as calcium hydroxide, magnesium hydroxide, barium hydroxide and the like, and hydroxide of metals which belong to IIIA group of a long periodic table such as aluminum hydroxide, and carbonate including alkali metal carbonate such as sodium carbonate, potassium carbonate and the like and alkaline-earth metal carbonate such as magnesium carbonate and the like. And as for organic amines, alkyl amine such as ethyl amine, diethyl amine and propyl amine and the like, alcohol amine such as monomethanol amine, monoethanol amine, monopropanol amine and the like, ammonia such as aqueous ammonia are exemplified. Among all, alkali metal hydroxide is preferable, and sodium hydroxide, potassium hydroxide and lithium hydroxide are particularly preferable, considering binding priority and operability.

A content ratio of binder with respect to 100 wt % of total solid content of porous membrane slurry is preferably 0.5 to 20 wt %, more preferably 0.5 to 10 wt %, and the most preferably 1 to 5 wt %. When content ratio of binder with respect to 100 wt % of total solid content of porous membrane slurry is within the above ratio, a removal (powder falls) of the below-mentioned non-conductive organic particles from a porous membrane of the invention is prevented; and flexibility of a porous membrane and cycle characteristic of a secondary battery using said porous membrane can be improved.

(Non-conductive Organic Particles)

Non-conductive organic particles of the invention have a functional group, which is cross-linkable with a hydrophilic acid group of the above-mentioned binder. In the invention, reactivity with hydrophilic acid group in binder can be improved by using non-conductive organic particles having a functional group which is cross-linkable with a hydrophilic acid group, and that dispersibility of non-conductive organic particles in porous membrane slurry can be improved as well. Note that non-conductive organic particles of the invention are polymer particles, which do not have binding priority. Therefore, unlike the above-mentioned binder, they do not have glass-transition temperature (Tg) or softening point of 100° C. or less.

A functional group, which is cross-linkable with a hydrophilic acid group, in non-conductive organic particles used in the invention is a functional group which can form a chemical bond with anion derived from hydrophilic acid group; and in concrete, an epoxy group, a N-methylol amide group, an oxazoline group, an allyl group, a isocyanate group, an oxetanyl group, an alkoxysilane group and the like can be exemplified. Among all, an epoxy group, an allyl group and an alkoxysilane group are preferable, and an epoxy group is the most preferable; since they are highly reactive with a hydrophilic acid group in binder and easily form cross-linkage, and density of said cross-linkage can be easily controlled by changing temperature and time when forming the cross-linkage. Note that functional group having cross-linkage property maybe one kind, or maybe two or more kinds.

When monomer having a functional group, which is cross-linkable with a hydrophilic acid group, is used when non-conductive organic particles are manufactured, said functional group can be introduced to non-conductive organic particles.

Examples of monomer having epoxy group include a monomer containing a carbon-carbon double bond and an epoxy group, a monomer containing a halogen atom and an epoxy group, and the like.

The monomers containing a carbon-carbon double bond and an epoxy group include; unsaturated glycidyl ether such as vinyl glycidyl ether, allyl glycidyl ether, butenyl glycidyl ether, o-allyl phenyl glycidyl ether and the like, monoepoxide of diene or polyene such as butadiene monoepoxide, chloroprene monoepoxide, 4,5-epoxy-2-pentene, 3,4-epoxy-1-vinylcyclohexene, 1,2-epoxy-5,9-cyclododecadiene and the like, alkenyl epoxide such as 3,4-epoxy-1-butene, 1,2-epoxy-5-hexene, 1,2-epoxy-9-decene and the like, glycidyl ester of unsaturated carboxylic acid such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexene carboxylic acid, glycidyl ester of 4-methyl-3-cyclohexenecarboxylic acid and the like.

Examples of monomer containing halogen atom and epoxy group include epihalohydrin such as epichlorohydrin, epibromhydrin, epiiodohydrin, epifluorohydrin, β-methyl-epichlorohydrin and the like, p-chlorostyreneoxide and dibromo phenylglycidyl ether and the like.

A monomer having N-methylol amide group includes (meth)acrylamide having methylol group such as N-methylol (meth)acrylamide and the like.

A monomer having oxazoline group includes 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, 2-isopropenyl-5-ethyl-2-oxazoline and the like.

A monomer having allyl group includes such as allyl acrylate, allyl methacrylate, allyl glycidyl ether and the like.

A monomer having isocyanate group includes such as vinyl isocyanate, allyl isocyanate, (meth)acrylic isocyanate, 2-(meth)acryloyloxyethylisocyanate, 2 isocyanatoethyl (meth)acrylate, m-isopropenyl-α,α-dimethylmethylbenzyl isocyanate and the like.

A monomer having oxetanyl group includes such as 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)-4-trifluoromethyloxetane and the like.

A monomer having alkoxysilane group includes such as vinyltrimethoxysilane, vinyltriethoxysilane, methacryloxypropylmethyldimethoxysilane, methacryloxypropyltrimethoxysilane, methacryloxypropylmethyldiethoxysilane, methacryloxypropyltriethoxysilane, 3-methacryloxytriethoxysilan and the like.

A content ratio of polymerized unit having a functional group, which is cross-linkable with a hydrophilic acid group, with respect to a total weight of the monomer in non-conductive organic particles is preferably 0.2 to 5 wt %, and more preferably 0.3 to 3 wt %. Further, a content of the functional group in non-conductive organic particles, with respect to the non-conductive organic particles, is preferably 0.008 to 0.240 mmol/g, more preferably 0.014 to 0.14 mmol/g. When amount of said functional group in non-conductive organic particles is within the above range, mobility of the functional group in non-conductive organic particles will be sufficiently maintained, and thus reactivity with binder will be improved. Consequently, strength of a porous membrane can be improved.

The non-conductive organic particles are preferable to further include polymerized unit of divinylbenzen. A content ratio of polymerized unit of divinylbenzen with respect to a total weight of the monomer in the non-conductive organic particles is preferably 20 to 80 wt %, more preferably 25 to 70 wt %, and the most preferably 30 to 60 wt %. When polymerized unit of divinylbenzen are included in non-conductive organic particles, cross-linkage density in non-conductive organic particles improve, followed by heat resistance improvement of non-conductive organic particles, and that reliability of the obtained secondary battery porous membrane improve.

It is preferable that non-conductive organic particles further include a polymerized unit of ethylvinyl benzene. A content ratio of polymerized unit of ethylvinyl benzene with respect to a total weight of the monomer in the non-conductive organic particles is preferably 3.2 to 48 wt %, and more preferably 10 to 40 wt %. When polymerized unit of ethylvinyl benzene are included in non-conductive organic particles, binding priority with the above-mentioned binder becomes good, and removal (powder falls) of non-conductive organic particles from a secondary battery porous membrane will be prevented. Further, flexibility of the obtained secondary battery porous membrane becomes good. Furthermore, when said secondary battery porous membrane is stacked on electrode and an electrode for secondary battery is manufactured, removal (powder falls) of electrode active materials can also be prevented. As a result, a secondary battery using said secondary battery porous membrane shows superior cycle characteristic.

Content weight ratio (divinylbenzene/ethylvinylbenzene) of polymerized unit of divinylbenzen and the same of ethylvinylbenzene included in non-conductive organic particles is preferably 1.0 to 5.25, more preferably 1.25 to 5.00, and the most preferably 1.25 to 4.75. When said content weight ratio of polymerized unit of divinylbenzen and the same of ethylvinylbenzene included in non-conductive organic particles is within the above range, cross-linkage density of non-conductive organic particles becomes high, improving heat resistance of the non-conductive organic particles. Consequently, flexibility and strength of the obtained secondary battery porous membrane improve. Further, removal (powder falls) of non-conductive organic particles from a secondary battery porous membrane can be prevented, and removal (powder falls) of electrode active material, when manufacturing an electrode for secondary battery using the porous membrane, can be prevented as well; and thus a secondary battery using the porous membrane shows superior cycle characteristic.

Non-conductive organic particles may include an arbitrary polymerized unit, in addition to the above-mentioned two polymerized units. Monomers constituting said arbitrary polymerized unit (arbitrary monomer) include a poly(meth)acrylate compound, an aromatic monovinyl compound, a vinyl cyanide compound, a (meth)acrylic ester monomer, a conjugated dienemonoomer, a vinylester compound, an α-olefin compound, a cationic monomer and hydroxyl group containing monomer. Two or more of said monomers may be included in the non-conductive organic particles.

A poly(meth)acrylate compound includes diacrylate compound such as polyethyleneglycoldiacrylate, 1,3-butyleneglycoldiacrylate, 1,6-hexaneglycoldiacrylate, neopentylglycoldiacrylate, polypropyleneglycoldiacrylate, 2,2'-bis(4-acryloyloxypropyloxyphenyl)propane, 2,2'-bis(4-acryloyloxydiethoxyphenyl)propane and the like, triacrylate compound such as trimethylolpropanetriacrylate, timethylolethanetriacrylate, tetramethylolmethanetriacrylate and the like, tetraacrylate compound such as tetramethylolmethanetetraacrylate and the like, dimethacrylate compound such as ethyleneglycoldimethacrylate, diethyleneglycoldimethacrylate, triethyleneglycoldimethacrylate, polyethyleneglycoldimethacrylate, 1,3-butyleneglycoldimethacrylate, 1,4-butyleneglycoldimethacrylate, 1,6-hexaneglycoldimethacrylate, neopentylglycoldimethacrylate, dipropyleneglycoldimethacrylate, polypropyleneglycoldimethacrylate, 2,2'-bis(4-methacryloxydiethoxyphenyl)propane and the like, and trimethacrylate compound such as trimethylol propanetrimethacrylate, trimethylol ethanetrimethacrylate and the like. Among all, ethyleneglycoldimethacrylate or trimethylol propanetrimethacrylate are preferably used.

The aromatic monovinyl compound includes styrene, α-methylstyrene, fluorostyrene, vinyl pyridine and the like.

The vinyl cyanide compound includes acrylonitril, methacrylonitrile and the like.

The acrylic acidestermonomer includes butylacrylate, 2-ethylhexylethylacrylate, N—N'-dimethylaminoethylacrylate and the like.

The methacrylic acidester monoomer includes butylmethacrylate, 2-ethylhexylmethacrylate, methylmethacrylate, 2-hydroxyethylmethacrylate, N,N'-dimethylaminoethylmethacrylate and the like.

The conjugated diene monomer includes butadiene, isoprene and the like.

The vinylester compound includes vinyl acetate and the like.

The α-olefin compound includes 4-methyl-1-pentene and the like.

The cationic monomer includes dimethylaminoethyl (meth)acrylate, dimethylaminopropyl(meth)acrylate, and the like.

The hydroxyl group containing monomer includes unsaturated ethylene alcohol such as (meth)allyl alcohol, 3-butene-1-ol, 5-hexene-1-ol and the like, alkanolester of unsaturated ethylene carboxylic acid such as acrylic acid-2-hydroxyethyl, acrylic acid-2-hydroxypropyl, methacrylic acid-2-hydroxyethyl, methacrylic acid-2-hydroxypropyl, di-2-hydroxyethyl maleate, di-4-hydroxybutyl maleate, itaconic acid di-2-hydroxypropyl and the like, ester of polyalkyleneglycol and (meth)acrylic acid shown by a general formula $CH_2=CR^1COO—(C_nH_{2n}O)_m—H$ ("m" is an integral number from 2 to 9, "n" is an integral number from 2 to 4 and "$R^1$" shows hydrogen or methyl group), mono (meth)acrylic acid ester of dihydroxyester of dicarboxylic acid such as 2-hydroxyethyl-2'-(meth)acryloyl oxyphthalate, 2-hydroxyethyl-2'-(meth)acryloyl oxysuccinate and the like, vinyl ether such as 2-hydroxyethylvinyl ether, 2-hydroxypropylvinyl ether and the like, mono(meth)allyl ether of alkyleneglycol such as (meth)allyl-2-hydroxyethylether, (meth)allyl-2-hydroxypropylether, (meth)allyl-3-hydroxypropylether, (meth)allyl-2-hydroxybutylether, (meth)allyl-3-hydroxybutylether, (meth)allyl-4-hydroxybutylether, (meth)allyl-6-hydroxyhexylether and the like, polyoxyalkyleneglycol(meth)mono allyl ether such as diethyleneglycol mono(meth)allyl ether, dipropyleneglycol mono(meth)allyl ether and the like, mono(meth)allyl ether of halogen and hydroxy substituted product of (poly)alkyleneglycol, such as glycerin mono(meth)allyl ether, (meth)allyl 2-chloro-3-hydroxypropylether, (meth)allyl-2-hydroxy-3-chloropropylether and the like, mono(meth)allyl ether of polyphenol, such as eugenol, isoeugenol and the like, and their halogen substituted product, (meth)allyl thioether of alkyleneglycol such as (meth)allyl-2-hydroxyethylthioether, (meth)allyl-2-hydroxypropylthioether and the like.

The above-mentioned arbitrary monomer may be one of any kind, or may be a combination of two or more kinds. Among said arbitrary monomers, styrene, methylmethacrylate or their combination are particularly preferable, considering reactivity with divinylbenzen and ethylvinyl benzene.

Content ratio of the arbitrary polymerized unit with respect to a total weight monomer in non-conductive organic particles is preferably 3 to 80 wt %, more preferably 4 to 70 wt %, and the most preferably 5 to 60 wt %. In particular, when styrene and/or methylmethacrylate is included as the arbitrary monomer, their preferable content ratio is 4.5 to 76.5 wt %, with respect to total monomer amount constituting the non-conductive organic particles. When containing both styrene and methylmethacrylate, their total amount is preferably within the above range. By setting a content ratio of styrene and/or methylmethacrylate 76.5 wt % or less, heat resistance of non-conductive organic particles can be improved and heat resistance of a porous membrane can be improved as well; and that occurrence of short circuit in a battery at a high temperature can be decreased. While by setting content ratio of styrene and/or methylmethacrylate 4.5 wt % or more, decrease in dispersibility of non-conductive organic particles can be prevented, strength of a porous membrane can be improved and uniformity of the membrane can be obtained as well.

(Manufacturing Method of Non-conductive Organic Particles)

Manufacturing method of non-conductive organic particles is not particularly limited; and a method can be exemplified wherein the above-described monomer constituting the non-conductive organic particles and the other arbitrary composition, if required, are dissolved or dispersed in a disperse media, and polymerized in a disperse liquid by an emulsifyingpolymerization method or a soap-free polymerization method.

In said emulsifyingpolymerization, it is preferable to divide polymerization into several steps for obtaining desired particle diameter and an average degree of circularity. For instance, seed polymer particles is formed by polymerizing a part of monomer constituting non-conductive organic particles at first, the other monomer is then absorbed to said seed polymer particles, and then polymerize in this state to manufacture non-conductive organic particles (a seed polymerization method). In addition, when forming seed polymer particles, the polymerization may be further divided into several steps.

In concrete, for instance, seed polymer particles A is formed by using a part of monomer constituting non-conductive organic particles; then seed polymer particles B, having larger particle diameter, is formed by using said seed polymer particles A and the other monomer constituting the non-conductive organic particles; and further, non-conductive organic particles, having even larger particle diameter, can be formed by using said seed polymer particles B, the rest of the monomers constituting non-conductive organic particles and the other arbitrary composition when required. As described, by forming seed polymer particles in a reaction of 2 steps, and then forming non-conductive organic particles, there are advantages that desired particle diameter and average degree of circularity can be steadily obtained. In this case, a part of or all of (preferably all of) the monomer having a functional group cross-linkable with a hydrophilic acid group of a monomer constituting non-conductive organic particles, is preferably used for forming seed polymer particles A and seed polymer particles B, in order to ensure stability of the particles. Further, in this case, styrene of an arbitrary monomer is preferably used as a monomer for forming seed polymer particles A, since it is preferable to ensure absorbency of monomer to seed polymer particles when forming seed polymer particles B and non-conductive organic particles.

As described, polymerization may be separated into several steps, and that all the monomers constituting non-conductive organic particles are not necessary be in a mixture state, when polymerized. When polymerization is performed with several steps, composition of monomers derived from a polymerized unit constituting non-conductive organic particles within the finally obtained non-conductive organic particles is preferable to satisfy the composition ratio of monomers constituting the above-mentioned non-conductive organic particles.

Medium used for polymerization of monomer, constituting non-conductive organic particles, includes water, organic solvent and their mixture. As for the organic solvent, a solvent inactive for radicalpolymerization, which does not inhibit polymerization of monomer, is used. Concrete examples of the organic solvent are alcohols such as methanol, ethanol, propanol, cyclohexanol, octanol and the like, esters such as dibutyl phthalate, dioctyl phthalate and the like, ketones such as cyclohexanone and the like, and their mixtures are exemplified. Preferably, aqueous medium such as water is used as a disperse media, and emulsifyingpolymerization is performed as polymerization.

Amount ratio of seed polymer particles and monomer when reacting is as follows. Used amount of monomer with respect to 1 part by weight of seed polymer particles is preferably 2 to 19 parts by weight, more preferably 3 to 16 parts by weight and the most preferably 4 to 12 parts by weight. When used amount of monomer with respect to 1 part by weight of seed polymer particles is 2 parts by weight or more, mechanical strength and heat resistance of the obtained non-conductive organic particles will be heightened. Further, when used amount of monomer with respect to 1 part by weight of seed polymer particles is 19 parts by weight or less, monomer can be efficiently absorbed to seed polymer particles, and that monomer amount not absorbed to the seed polymer particles can be maintained in a small range. Further, particle diameter of non-conductive organic particles can be well controlled, and that generation of coarse particles having a wide range of particle size distribution or a large amount of fine particles can be prevented.

Specific handling of the polymerization includes a method, wherein a monomer is poured to an aqueous dispersion of seed polymer particles at once, and a method, wherein a monomer is separately or constantly added when conducting polymerization. It is preferable that monomer is absorbed to seed polymer particles, before polymerization begins and cross-linkage is substantially formed in the seed polymer particles.

Monomer will not be absorbed to seed polymer particles when said monomer is added at or after intermediate of the polymerization, which leads to a generation of a large amount of fine particle followed by a deterioration of polymerization stability, and polymerization reaction may not be maintained. Considering above, it is preferable that all the monomers may be added to seed polymer particles prior to polymerization, or all the monomers may be added before polymerize conversion rate reaches around 30%. In particular, it is preferable that monomer is added to an aqueous dispersion of seed polymer particles prior to the start of polymerization and stirred, and then polymerization begins after it is absorbed to the seed polymer particles.

An arbitrary composition can be added to the polymerization reaction system, in addition to a monomer constituting non-conductive organic particles and disperse media. In concrete, a component of such as polymeric initiator, surfactant, suspension protecting agent and the like can be added. As for polymeric initiator, although a general water-soluble radicalpolymeric initiator or oil-soluble radicalpolymeric initiator can be used, water-soluble radicalpolymeric initiator is preferably used, since monomers not absorbed to seed polymer particles are unlikely to start polymerize in aqueous phase. A water-soluble radicalpolymeric initiator includes potassium persulfate, sodium persulfate, cumene hydroperoxide, hydrogen peroxide, and redox containing initiator, which is a combination of the above-mentioned water-soluble initiator or the below-mentioned oil-soluble initiator and reducing agent such as sodiumhydrogen bisulfate, and the like. Further, oil-soluble radical polymeric initiator includes benzoylperoxide, a,a'-azobisisobutyronitrile, t-butyl peroxy-2-ethylhexanoate, 3,5,5-trimethylhexanoyl peroxide and the like. Among the oil-soluble radical polymeric initiator, t-butylperoxy-2-ethylhexanoate can be preferably used. Note that in the polymerization reaction, it is preferable to add a small amount of water-soluble polymerization inhibitor, such as potassium dichromate, ferric chloride, hydroquinone and the like, since generation of fine particles can be prevented.

Generally used surfactant can be used; and anion containing emulsifier, such as sodium dodecylbenzenesulfonate, sodium lauryl sulfate, sodium dialkyl sulfosuccinate, formalin condensation of naphthalenesulfonate and the like can be exemplified. Further, a combination use of non-ionic containing surfactant, such as polyoxyethylenenonylphenyl ether, polyethyleneglycolmonostearate, sorbitanmonostearate and the like, is possible. Preferable suspension protecting agent includes polyvinyl alcohol, carboxymethyl cellulose, sodium polyacrylate, fine powder inorganic compounds and the like.

(Characteristics of Non-conductive Organic Particles)

A shape of non-conductive organic particles according to the present invention is not particularly limited; and can be a spherical shape, a needle shape, a rod shape, a spindle shape, a plate shape and the like. However, a spherical shape, a needle shape and a spindle shape are preferable. Further, particles having porous property can be used as non-conductive organic particles. A content ratio of the non-conductive organic particles with respect to 100 wt % of a total solid content of porous membrane slurry is preferably 70 to 97 wt %, more preferably 80 to 95 wt %, and the most preferably 85 to 95 wt %. When content ratio of the non-conductive organic particles with respect to 100 wt % of a total solid content of porous membrane slurry is within the above range, a porous membrane showing high heat stability can be obtained. In addition, removal (powder falls) of non-conductive organic particles from a porous membrane can be prevented, a porous membrane with a high strength can be obtained, and a decrease in battery characteristics, such as cycle characteristic, can be prevented.

When non-conductive organic particles show high heat resistance, heat resistance is provided to its porous membrane, and a reliability of the below-mentioned secondary battery electrode or secondary battery separator improves, which is preferable. In concrete, a temperature in which weight reduction ratio of non-conductive organic particles reaches 10 wt %, when heated at a temperature rising rate of 10° C./min. by a thermobalanceana analysis under a nitrogen atmosphere, is preferably 250° C. or more, more preferably 300° C. or more, and the most preferably 360° C. or more. On the other hand, although upper limit of the temperature is not particularly limited, it may be 450° C. or less.

In the invention, non-conductive organic particles having content of metallic foreign particles of 100 ppm or less is preferably used. When non-conductive organic particles including many metallic foreign particles or metallic ion are used, said metallic foreign particle or metallic ion elute in a porous membrane slurry, and they are ion cross-linkable with polymers in a porous membrane slurry, porous membrane slurry aggregates, and as a result, porous property of a porous membrane is lowered. Therefore, rate characteristic (power output characteristic) of secondary battery using the porous membrane is at a risk of deterioration. As for said metals, containing Ca, Co, Cu, Fe, Mg, Ni, Zn, Cr and the like are particularly unfavorable. Therefore, a metal content in non-conductive organic particles, by a total amount of these metal ions, is preferably 100 ppm or less, more preferably 50 ppm or less. Less the above-described content means less deterioration in battery characteristic. Here, "metallic foreign particle" defines metals alone or metal ions, other than non-conductive organic particles. A content of metallic foreign particles in non-conductive organic particles can be measured with ICP (Inductively Coupled Plasma).

An average particle diameter of non-conductive organic particles according to the invention is preferably 0.1 to 2.0 μm, more preferably 0.1 to 1.0 μm, and the most preferably 0.1 to 0.8 μm. When average particle diameter of non-conductive organic particles is within the above range, dispersing state of porous membrane slurry become easily controlled, and that a uniform porous membrane having a predetermined thickness can be easily manufactured. Further, an increase of particle filling rate in a porous membrane can be prevented; and that decrease in ion conductivity in a porous membrane can be prevented and superior cycle characteristic can be realized. When an average particle diameter of non-conductive organic particles is within a range of 0.1 to 0.8 μm, it is particularly preferable since it is superior in dispersibility, ease in coating and in control of voids. Average particle diameter can be obtained from an average value calculated from (a+b)/2, wherein "a" is a maximal length and "b" is a minimal length of particle images of 100 or more particles, which were observed from electron microscope.

Average degree of circularity of non-conductive organic particles of the invention is preferably 0.900 to 0.995, more preferably 0.91 to 0.98, and the most preferably 0.92 to 0.97. When an average degree of circularity of non-conductive organic particles is within the above-range, contact area between non-conductive organic particles can be suitably maintained, and that strength and heat resistance of a porous membrane can be improved. As a result, reliability of a secondary battery using said porous membrane can be improved.

For BET specific surface area of non-conductive organic particles used in the invention, in particular, 0.9 to 200 $m^2/g$ is preferable, and 1.5 to 150 $m^2/g$ is more preferable, in order to show preferable fluidity of porous membrane slurry.

Particle size distribution of non-conductive organic particles is preferably 1.00 to 1.4, more preferably 1.00 to 1.3, and the most preferably 1.00 to 1.2. When particle size distribution of the non-conductive organic particles is within the above range, predetermined void can be maintained between non-conductive organic particles, and that movement of lithium in a secondary battery of the invention can be inhibited and resistance growth can be prevented. Note that particle size distribution of non-conductive organic particles can be obtained from a ratio V/N, wherein "V" is a volume average particle diameter and "N" is a number average particle diameter, after particle diameter measurement was performed with Laser Diffraction Scatter Particle Size Distribution Measuring Device (L5230) by Beckman Co., Ltd.

(Solvent)

Both water and organic solvent can be used as solvent of a porous membrane slurry. Organic solvent includes cyclicaliphatic hydrocarbon such as cyclopentane, cyclohexane and the like, aromatic hydrocarbon such as toluene, xylene, ethylbenzene and the like, ketone such as acetone, ethylmethylketone, diisopropyl ketone, cyclohexanone, methylcyclohexane, ethylcyclohexane and the like, chlorine aliphatic hydrocarbon such as methylenechloride, chloroform, carbon tetrachloride and the like, ester such as acetic ether, acetic butyl, γ-butyrolactone, ∈-caprolactone and the like, acylnitrile such as acetonitrile, propionitrile and the like, ether such as tetrahydrofuran, ethyleneglycoldiethylether and the like, alcohol such as methanol, ethanol, isopropanol, ethyleneglycol, ethyleneglycol monomethylether, and the like, amide such as N-methylpyrrolidone, N,N-dimethylformamide and the like.

These solvents can be used alone or a combination of 2 or more can be used as a mixed solvent. Among all, a solvent, superior in dispersibility of non-conductive organic particles, having a low boiling point and a high volatile, is preferable since it can be removed in a short time at a low temperature. In concrete, acetone, toluene, cyclohexanone, cyclopentane, tetrahydrofuran, cyclohexane, xylene, water, N-methylpyrrolidone, or their mixtures are preferable.

(Arbitrary Composition)

In addition to the above components (binder, non-conductive organic particles and solvent), an arbitrary composition can further be included in a porous membrane slurry. Such an arbitrary composition includes inorganic particles, dispersant, leveling agent, antioxidizing agent, binder other than the above binder, thickener, antifoam agent, electrolytic solution additive agent, which has functions such as inhibiting decomposition of electrolytic solution, and the like. These are not particularly limited, as long as they do not effect battery reaction.

Inorganic particles include aluminum oxide, silicon oxide, magnesium oxide, titanium oxide, aluminum nitride, calcium fluoride, barium fluoride talc, montmorillonite and the like. A content ratio of inorganic particles with respect to 100 wt % of total solid content in porous membrane slurry is 20 wt % or less, more preferably 10 wt % or less. When a content ratio of inorganic particles is within the range, a porous membrane with a high strength can be obtained.

Dispersant includes anionic compound, cationic compound, non-ionic compound, high-molecular compound and the like. Dispersant is selected depending on the used non-conductive organic particles. A content ratio of a dispersant with respect to 100 wt % of total solid content in porous membrane slurry is preferably within a range, which does not affect battery characteristic, and in concrete, 10 wt % or less. When a content ratio of the dispersant is within the range, coating priority of porous membrane slurry of the invention is good, and uniform porous membrane can be obtained.

Leveling agent includes surfactants such as alkyl containing surfactant, silicone containing surfactant, fluorine containing surfactant, metal containing surfactant and the like. A content ratio of a surfactant with respect to 100 wt % of total solid content in porous membrane slurry is preferably within a range, which does not affect battery characteristic, and in concrete, 10 wt % or less. When mixing the above-mentioned surfactant, a generation of cissing, when coating porous membrane slurry of the invention on a predetermined base material, can be prevented; and smoothing property of the porous membrane can be improved.

Antioxidizing agents includes phenol compound, hydroquinone compound, organic phosphorous compound, sulfur compound, phenylenediamine compound, polymer type phenol compound and the like. Polymer type phenol compound is a polymer comprising phenol structure within a molecule; and a polymer type phenol compound having a weight-average molecular weight of 200 to 1000, preferably 600 to 700 is preferably used. A content ratio of the antioxidizing agent with respect to 100 wt % of total solid content in porous membrane slurry is preferably within a range, which does not affect battery characteristic, and in concrete, 10 wt % or less. When content ratio of the antioxidizing agent is within this range, cycle life of a battery is superior.

Binder other than the above-mentioned binder is a binder used in the below-mentioned electrode such as polytetrafluoroethylene (PTFE), polyvinylidene fluoride (PVDF), polyacrylic acid derivative, polyacrylonitril derivative, softpolymer and the like. A content ratio of a binder other than the above-mentioned binder with respect to 100 wt % of total solid content in porous membrane slurry is 10 wt % or less. When content ratio of the binder is within this range, adhesion of porous membrane of the invention with the below-mentioned electrode active material layer or the organic separator is good.

The thickener includes cellulose containing polymers, such as carboxymethylcellulose, methylcellulose, hydroxypropylcellulose, and their ammonium salt and alkali metal salt, (modified)poly(meth)acrylic acid and their ammonium salt and alkali metal salt, polyvinyl alcohol such as (modified)polyvinyl alcohol, copolymer of acrylic acid or acrylic acid salt with vinyl alcohol, copolymer of maleic anhydride, maleic acid or fumaric acid with vinyl alcohol, polyethyleneglycol, polyethyleneoxide, polyvinyl pyrolidone, modifiedpolyacrylic acid, oxidizedstarch, phosphate starch, casein, various modified starch, acrylonitrile-butadiene copolymer hydride and the like. A content ratio of a thickener with respect to 100 wt % of total solid content in porous membrane slurry is preferably within a range which does not affect battery characteristic, and in concrete, 10 wt % or less. When content ratio of the thickener is within this range, coating priority of porous membrane slurry of the invention, or adhesion of porous membrane of the invention with the below-mentioned electrode active material layer or organic separator is good. In the invention, "(modified)poly" defines "unmodifiedpoly" or "modifiedpoly", and "(meth)acrylic" defines "acrylic" or "(meth)acrylic".

Antifoam agent includes metallic soaps, polysiloxane, polyether, higher alcohol, perfluoroalkyl and the like. A content ratio of the antifoam agent with respect to 100 wt % of total solid content in porous membrane slurry is preferably within a range which does not affect battery characteristic, and in concrete, 10 wt % or less. Antifoaming steps of the binder can be shortened by mixing antifoam agent.

Electrolytic solution additive agent includes such as vinylene carbonate used in a slurry for electrode and in electrolytic solution, which is mentioned below. A content ratio of the electrolytic solution additive agent with respect to 100 wt % of total solid content in porous membrane slurry is preferably within a range which does not affect battery characteristic, and in concrete, 10 wt % or less. Cycle life of a battery is superior when electrolytic solution additive agent is included.

Besides the above, nano fine particles such as fumed silica, fumed alumina and the like can be exemplified. Thixotropy of porous membrane slurry can be controlled by mixing the nano fine particles; and thus leveling property of the obtained porous membrane can be improved.

A content ratio of the arbitrary composition with respect to 100 wt % of total solid content in porous membrane slurry is preferably 40 wt % or less, more preferably 20 wt % or less. However, when a total amount of the above-mentioned binder, non-conductive organic particles and arbitrary compositions (note that binder is removed) is less than 100 wt %, a content ratio of the binder as an arbitrary composition can be suitably increased, and obtain a composition.

Although solid content concentration of a porous membrane slurry is particularly not limited, as long as application and immersion of the slurry are possible and the slurry comprises a viscosity having fluidity, it is generally around 10 to 50 wt %.

The other component other than the solid content is a component which can volatilize with a drying step; and in addition to the above-mentioned solvent, medium, in which binder and non-conductive organic particles were dissolved or dispersed when preparing and adding the same, is also included.

A manufacturing method of slurry for secondary battery porous membrane is not particularly limited; and it is manufactured by mixing the above-mentioned binder, non-conductive organic particles, solvent, and an arbitrary composition, when required. In the invention, with the above-mentioned composition (binder, non-conductive organic particle, solvent and arbitrary composition, added when required), regardless of a mix method or a mix order, a porous membrane slurry wherein non-conductive organic particles are highly dispersed. As for a mixing device, mixing devices used when manufacturing the above-mentioned binder can be used. Among all, it is particularly preferable to use a highly dispersed device, such as a bead mill, a roll mill, a filmix and the like, which can add a high disperse share.

Viscosity of porous membrane slurry, in view of uniform coating priority, and slurry stability with time, it is preferably 10 to 10,000 mPa·s, more preferably 50 to 500 mPa·s. Said viscosity was measured using a B-type viscometer at 25° C. with a rotational frequency of 60 rpm.

In a porous membrane slurry, a weight ratio (a hydrophilic acid group/a functional group cross-linkable with the hydrophilic acid group) of hydrophilic acid group in binder with respect to a functional group cross-linkable with the hydrophilic acid group in non-conductive organic particles is preferably 0.2 to 3, more preferably 0.3 to 3, and the most preferably 0.3 to 2. When said weight ratio (a hydrophilic acid group/a functional group cross-linkable with the hydrophilic acid group) is within he above range, gelatification of the porous membrane slurry can be prevented and coating priority of the porous membrane slurry is made superior; and that flexibility and strength of a porous membrane improve.

(2) A Secondary Battery Porous Membrane

A secondary battery porous membrane (hereinafter, sometimes mentioned as "a porous membrane") of the invention is manufactured by forming the above-mentioned secondary battery porous membrane slurry to a membrane and drying the same.

Further, a porous membrane of the invention comprises a cross-linkage structure between a binder, including a polymerized unit of vinyl monomer having a hydrophilic acid group, and non-conductive organic particles, having a functional group cross-linkable with the hydrophilic acid group. The cross-linkage structure is a molecular structure formed by chemical binding a binder and non-conductive organic particles.

A porous membrane of the invention comprises a moderate porous property by having voids between binder and non-conductive organic particles. The porous membrane is used by stacking on an organic separator or electrode, or used as an organic separator.

<Manufacturing Method of a Secondary Battery Porous Membrane>

Manufacturing methods of a porous membrane of the invention include; (I) a method wherein a porous membrane slurry, including the above-mentioned binder, non-conductive organic particles, solvent and an arbitrary composition, is applied on a predetermined base material (a positive electrode, a negative electrode or an organic separator), and then dried thereof, (II) a method wherein a porous membrane slurry, including the above-mentioned binder, non-conductive organic particles, solvent and an arbitrary composition, is immersed on base material (positive electrode, negative electrode or organic separator), and then dried thereof, (III) a method wherein a porous membrane slurry, including the above-mentioned binder, non-conductive organic particles, solvent and an arbitrary composition, is applied on a release film, membrane formed, and the obtained porous membrane is transferred to a predetermined base material (positive electrode, negative electrode or organic separator), and then dried thereof. Among all, (I) a method wherein a porous membrane slurry is applied to base material (positive electrode, negative electrode or organic separator), and then drying the same is the most preferable since thickness of membrane of a porous membrane is easily controlled.

A porous membrane of the invention is manufactured with the methods (I) to (III), and its manufacturing method will be described below in detail.

With the method (I), a porous membrane slurry is applied to a predetermined base material (positive electrode, negative electrode or organic separator), and by drying the same, a porous membrane of the invention is manufactured.

A method applying the slurry on base material is not particularly limited; and such as a doctor blade method, a reverse roll method, a direct roll method, a gravure method, an extrusion method, a brush application method and the like are exemplified. Among all, a gravure method is preferable since uniform porous membrane can be obtained.

Drying methods exemplify a drying method, wherein it is dried by a warm air, a hot air, a low moisture air and the like, a vacuum drying, and a drying method, wherein it is dried by irradiation such as (far) infrared radiation or electron ray. A drying temperature can be modified according to the used solvent. In order to completely remove solvent, it is preferable to use a fan type drying device at a high temperature of 120° C. or more, when using a low volatile solvent such as N-methylpyrrolidone. While it can be dried at a temperature of 100° C. or less, when using a highly volatile solvent. When a porous membrane is formed on the below-mentioned organic separator, it is required to dry without causing shrinkage of organic separator; and that it is preferable to dry at a low temperature of 100° C. or less.

With the method (II), a porous membrane slurry is immersed to base material (positive electrode, negative electrode or organic separator), and by drying the same, a porous membrane of the invention is manufactured. A method immersing the slurry on base material is not particularly limited; and may be immersed by dip coating with a dip coater and the like.

The same method with the drying method used in above (I) can be exemplified.

With the method (III), a porous membrane slurry is applied to a release film, membrane is formed, and a porous membrane formed on a release film is manufactured. Next, the obtained porous membrane is transferred onto base material (positive electrode, negative electrode or organic separator).

The same method with the application method used in above (I) can be exemplified. Said transfer method is not particularly limited.

The porous membrane obtained with the methods (I) to (III), is then may be under a pressure treatment, using a mold press, a roll press and the like when necessary, and adhesion between base material (positive electrode, negative electrode or organic separator) and a porous membrane may be improved. However, on this occasion, an excessive pressure treatment may deteriorate voidage of a porous membrane, and that a pressure as well as a pressure time is suitably controlled.

Although a thickness of membrane according to the porous membrane is not particularly limited, and suitably set according to the porous membrane usage and applied area, an uniform membrane cannot be formed when it is too thin, while capacity per volume in a battery decreases when it is too thick; and that it is preferably 0.5 to 50 µm, and more preferably 0.5 to 10 µm.

A porous membrane of the invention is formed on a surface of base material (positive electrode, negative electrode or organic separator), and particularly preferable for a protection membrane or separator of the below-mentioned electrode active material layer. A porous membrane of the invention may be formed on the surface of any one of positive electrode, negative electrode or organic separator; and it can be formed on all of positive electrode, negative electrode and organic separator, (3) An Electrode for Secondary Battery As for an electrode for secondary battery, a lithium ion secondary battery, nickel hydride secondary battery and the like are exemplified. Among all, an enhanced safety is the most required and since it is the most effective for introducing a porous membrane, a lithium ion secondary battery is preferable. Therefore, the use in a lithium ion secondary battery will be described hereinafter.

An electrode for secondary battery of the invention comprises; a current collector, electrode active material layer, including an electrode active material and a binder, which is adhered to the current collector, and the above-mentioned secondary battery porous membrane stacked on a surface of the electrode active material layer. Namely, in an electrode for secondary battery of the invention, electrode active material layer, including an electrode active material and a binder, is adhered to a current collector, and a secondary battery porous membrane is stacked on a surface of said electrode active material layer.

(Electrode Active Material)

Electrode active material used in an electrode for a lithium ion secondary battery can be any, as long as it can inject and emission lithium ions reversibly when subjected to an electrical potential in electrolyte; and it may be an inorganic or an organic compound.

Electrode active material (positive electrode active material) for a lithium ion secondary battery positive electrode is classified roughly to a material of inorganic compound and the same of organic compound. Positive electrode active materials of an inorganic compound include a transition metal oxide, a complex oxide of lithium and transition metal, a transition metal sulfide and the like. The above-mentioned transition metal includes Fe, Co, Ni, Mn, and the like. A concrete example of inorganic compound used in the positive electrode active material is a lithium containing combined metal oxide, such as $LiCoO_2$, $LiNiO_2$, $LiMnO_2$, $LiMn_2O_4$, $LiFePO_4$, $LiFeVO_4$ and the like, a transition metal sulfide such as $TiS_2$, $TiS_3$, amorphous $MoS_2$ and the like, and transition metal oxide such as $Cu_2V_2O_3$, amorphous $V_2O$—$P_2O_5$, $MoO_3$, $V_2O_5$, $V_6O_{13}$ and the like. Element substitution may be partly performed in these compounds. Positive electrode active materials of an organic compound may include conducting polymers such as polyacetylene, poly-p-phenylene and the like. Ion based oxide, lack of electrical conductivity, may be used as an electrode active material covered with carbon material, with the presence of carbon source materials during reduction firing. Further, these compounds may be performed with a partial element substitution.

Positive electrode active material of a lithium ion secondary battery may be a mixture of inorganic and organic compounds. Although a particle diameter of positive electrode active material is suitably selected considering an arbitrary formation requirement of battery, in view of improving battery characteristics such as rate characteristic, cycle characteristic, and the like, 50% volume cumulative average diameter is generally 0.1 to 50 µm, and preferably 1 to 20 µm. When said 50% volume cumulative average diameter is within this range, a secondary battery having a large charge and discharge capacity can be obtained; and thus it is easy to manufacture electrode slurry and electrode. The 50% volume cumulative average diameter can be obtained by measuring particle size distribution with laser diffraction.

Electrode active material (negative electrode active material) for a lithium ion secondary battery negative electrode includes carbonaceous material such as an amorphous carbon, graphite, natural graphite, meso-carbon microbeads, pitch-based carbon fiber and the like, and a conductive high-molecular compound such as polyacene and the like. Further, negative electrode active materials include metals, such as silicon, tin, zinc, manganese, iron, nickel and the like, their alloys, an oxide or sulfate of said metals or their alloys, and the like. In addition, lithium alloys, such as metallic lithium, Li—Al, Li—Bi—Cd, Li—Sn—Cd and the like, lithium transition metal nitride, silicone and the like can be used. Electrode active materials, wherein a conductive providing material is adhered on a surface by a mechanical reforming method, may also be used. Although particle diameter of negative electrode active material is suitably selected considering the other formation requirement, in view of improving battery characteristics such as initial efficiency, rate characteristic, cycle characteristic and the like, 50% volume cumulative average diameter is generally 1 to 50 µm, preferably 15 to 30 µm.

(Binder for Electrode)

In the invention, the electrode active material layer includes binder (Hereinafter, often mentioned as "binder for electrode"), in addition to electrode active materials. When binder for electrode is included, binding priority of electrode active material layer in electrode improves, a strength with respect to a mechanical force, acted during an electrode winding step and the like, improves, electrode active material layer in electrode becomes less likely to be removed, and thus, a risk of short circuit and the like by detached materials is reduced.

Binder for electrode may be various resin components. For instance, polyethylene, polytetrafluoroethylene (PTFE), polyvinylidene fluoride (PVDF), tetrafluoroethylene-hexafluoropropylene copolymer (FEP), polyacrylic acid derivative, polyacrylonitril derivative and the like may be used. These can be used alone or a combination of two or more kinds can be used. Further, a binder used for a porous membrane of the invention can be used as a binder for electrode.

Further, the below exemplified softpolymers can also be used as a binder for electrode;

a single polymer of acrylic acid or methacrylic acid derivative or, an acrylic containing softpolymer, which is a copolymer of said single polymer and a monomer copolymerizable thereof, such as polybutylacrylate, polybutylmethacrylate, polyhydroxyethylmethacrylate, polyacrylamide, polyacrylonitril, butylacrylate.styrene copolymer, butylacrylate.acrylonitril copolymer, butylacrylate.acrylonitril.glycidyl methacrylate copolymer and the like, a isobutylene based softpolymer such as poly isobutylene, isobutylene.isoprene rubber, isobutylene.styrene copolymer and the like, a diene containing softpolymer such as polybutadiene, polyisoprene, butadiene.styrenerandom copolymer, isoprene.styrenerandom copolymer, acrylonitril.butadiene copolymer, acrylonitril.butadiene.styrene copolymer, butadiene.styrene.block copolymer, styrene.butadiene.styrene.block copolymer, isoprene.styrene.block copolymer, styrene.isoprene.styrene.block copolymer and the like, a silicon containing softpolymer such as dimethylpolysiloxane, diphenylpolysiloxane, dihydroxypolysiloxane, and the like, an olefin containing softpolymer such as liquid polyethylene, polypropylene, poly-1-butene, ethylene.α-olefin copolymer, propylene.α-olefin copolymer, ethylene.propylene.diene copolymer (EPDM), ethylene.propylene.styrene copolymer and the like, a vinyl containing softpolymer such as polyvinyl alcohol, polyvinyl acetate, polystearate vinyl, vinyl acetate.styrene copolymer and the like, an epoxy containing softpolymer such as polyethyleneoxide, polypropyleneoxide, epichlorohydrin rubber a fluorine containing softpolymer such as vinylidene fluoride containing rubber, tetrafluoroethylene propylene rubber and the like, and the other softpolymers such as natural rubber, polypeptide, protein, polyester containing thermoplastic elastomer, vinyl chloride containing thermoplastic elastomer, polyamide containing thermoplastic elastomer and the like.

These softpolymers may have a cross-linkage structure, or may be introduced with a functional group by modification.

An amount of binder for electrode in an electrode active material layer is, with respect to 100 parts by weight of electrode active materials, preferably 0.1 to 5 parts by weight, more preferably 0.2 to 4 parts by weight, and the most preferably 0.5 to 3 parts by weight. When the binder for electrode in an electrode active material layer is within the above range, removal of active materials can be prevented without inhibiting battery reaction.

Binder for electrode is prepared as a solution or a disperse liquid, in order to manufacture an electrode. Its viscosity is generally within a range of 1 to 300,000 mPa·s and preferably 50 to 10,000 mPa·s. Said viscosity is a value measured with B-type viscometer at 25° C. with a rotational frequency of 60 rpm.

(An Arbitrary Additive Agent)

In the invention, an arbitrary additive agent such as conductive providing material or reinforcing material and the like may be contained, in addition to the above-mentioned electrode active material and binder for electrode in an electrode active material layer. As conductive providing material, conductive carbons such as acetylene black, ketjen black, carbon black, graphite, vapor phase grown carbon fiber, carbon nanotube and the like may be used; and carbon powders such as graphite, fiber or foil of various metals are exemplified. Reinforcing material includes various inorganic or organic filler having a spherical shape, a plate shape, a rod shape or a fibrous shape. By using said conductive providing material, electrical contact between electrode active materials can be improved; and when used in a lithium ion secondary battery, a discharge rate characteristic can be improved. Used amount of conductive providing material or reinforcing material is generally 0 to 20 parts by weight, and preferably 1 to 10 parts by weight with respect to 100 parts by weight of electrode active materials. Further, isothiazoline based compound or chelate compound may be included in electrode active material layer.

Electrode active material layer may be formed by adhering slurry (hereinafter, often mentioned as "electrode slurry"), including electrode active material, binder for electrode and solvent, to a current collector.

Although solvent can be any as long as binder for electrode is dissolved or dispersed to a particle state, a solvent wherein the agent is dissolved is preferable. When a solvent, wherein binder for electrode is dissolved, is used, the binder for electrode is absorbed to a surface of electrode active material or arbitrary additive agent, which will stabilize disperse of electrode active material and the like.

Solvent used for the electrode slurry can be water or organic solvent. The organic solvent includes cyclicaliphatic hydrocarbon such as cyclopentane, cyclohexane and the like, aromatic hydrocarbon such as toluene, xylene and the like, ketone such as ethylmethylketone, cyclohexanone and the like, ester such as acetic ethyl, acetic butyl, γ-butyrolactone, ∈-caprolactone and the like, acylnitrile such as acetonitrile, propionitrile and the like, ether such as tetrahydrofuran, ethyleneglycoldiethylether and the like, alcohol such as methanol, ethanol, isopropanol, ethyleneglycol, ethyleneglycol monomethylether and the like, and amido such as N-methylpyrrolidone, N,N-dimethylformamide and the like. These solvents may be used alone or a mixture of two kinds or more, which is suitably selected in view of drying rate or environment.

In addition, additive agent expressing various functions such as thickener may be contained in the electrode slurry. A polymer, soluble to a solvent used for electrode slurry, is used as the thickener. In concrete, a thickener exemplified in the porous membrane slurry of the invention may be used. The used amount of the thickener is preferably 0.5 to 1.5 parts by weight, with respect to 100 parts by weight of electrode active material. When used amount of thickener is within the above range, coating property of electrode slurry and adhesion with current collector are superior.

The electrode slurry further includes, in addition to the above components and in view of improving stability of a battery and lengthening its life-span, trifluoropropylene carbonate, vinylene carbonate, catechol carbonate, 1,6-dioxaspiro[4,4]nonane-2,7-dione, 12-crown-4-ether and the like. In addition, these may be used by being contained in the below-mentioned electrolytic solution.

Amount of the solvent in the electrode slurry is used by adjusting its viscosity suitable for a coating, depending on a kind of electrode active material or binder for electrode. In concrete, a solid content concentration of electrode active material, binder for electrode and an arbitrary additive agent such as conductive providing material is adjusted to preferably 30 to 90 wt %, more preferably 40 to 80 wt %.

The electrode slurry is obtained by mixing an electrode active material, a binder for electrode, an arbitrary additive agent such as conductive providing material, added when necessary, and a solvent, using a mixing device. The mixture can be performed by supplying all the above components to the mixing device at once. When an electrode active material, a binder for electrode, a conductive providing material and a thickener are used as composition of the electrode slurry, it is preferable to mix conductive providing material and thickener in a solvent, disperse the conductive providing material to a fine particle state, add a binder for electrode and an active material, and further to mix thereof, in view of improving dispersibility of the slurry. The mixing device include ball mill, sand mill, pigment disperser, stone mill, ultrasonic disperser, homogenizer, planetary mixer, hobart mixer and the like. It is preferable to use ball mill, since aggregation of conductive providing material or electrode active material ca be prevented.

Particle diameter of electrode slurry is preferably 35 μm or less, more preferably 25 μm or less. When particle diameter of the slurry is within the above range, a high dispersibility of conductive providing material and uniform electrode can be obtained.

(Current Collector)

Although current collector is not particularly limited as long as it is a material having an electrical conductivity and an electrochemical durability, in view of having heat resistance, metal materials such as iron, copper, aluminum, nickel, stainless steel, titanium, tantalum, gold, platinum and the like are preferable. Among all, aluminum is particularly preferable for positive electrode of a lithium ion secondary battery and copper is particularly preferable for negative electrode of a lithium ion secondary battery. Although a shape of the current collector is not particularly limited, a sheet type having a thickness around 0.001 to 0.5 mm is preferable. In order to highten adhesion strength of electrode active material layer, preliminarily roughen treatment of current collector is preferable. The roughen methods include a mechanical polishing method, an electropolishing method, a chemical polishing method and the like. In the mechanical polishing method, a coated abrasive to which polishing particles are bonded, a grinding stone, an emery wheel, a wire-brush provided with steel cable and the like are used. Further, in order to highten adhesion strength or conductivity of an electrode active material layer, an inner layer may be formed on the surface of current collector.

A manufacturing method of an electrode active material layer can be any as long as an electrode active material layer is bonded at least on one-side, preferably on both sides of the current collector in a layer form. For instance, the electrode slurry is applied to the current collector and heat treated at 120° C. or more for 1 hour or more; and an electrode active material layer is formed. An application method of electrode slurry on current collector is not particularly limited. For instance, a doctor blade method, a dip method, a reverse roll method, a direct roll method, a gravure method, an extrusion method and a brush application method can be exemplified. Drying methods include a drying by such as warm air, hot air, a low moisture air, a vacuum drying and a drying method by irradiation of such as (far) infrared radiation or electron ray.

Next, it is preferable to lower a voidage of electrode active material layer by pressure treatment using a mold press, a roll press and the like. Range of the voidage is preferably 5 to 15%, and more preferably 7 to 13%. An excessive voidage deteriorates charging efficiency or discharge efficiency. When the voidage is too low, it may cause problems such as a high volume capacity is difficult to obtain and an electrode active material layer is easy to be released. Further, when a curable polymer is used, it is preferable to be cured.

Thickness of electrode active material layer, for both positive electrode and negative electrode, is generally 5 to 300 μm, preferably 10 to 250 μm.

An electrode for secondary battery of the invention is manufactured by stacking a secondary battery porous membrane of the invention on a surface of an electrode active material layer of a current collector wherein electrode active material layers are bind in a layer form Although the stacking method is not particularly limited, methods of (I) to (III), described in the above-described manufacturing method of a porous membrane, may be exemplified.

(4) A Separator for Secondary Battery

A separator for secondary battery of the invention comprises an organic separator and a secondary battery porous membrane, stacked on the organic separator. Namely, a separator for secondary battery of the invention is manufactured by stacking the above secondary battery porous membrane on the surface of organic separator.

(Organic Separator)

As an organic separator for a lithium ion secondary battery, a well-known separator including polyolefin resin, such as polyethylene, polypropylene, or aromatic polyamide resin is used.

As for an organic separator of the invention, a porous membrane without electron conductivity, provided with ion conductivity, a high resistivity of organic solvent and fine pore diameter, is used. And for instance, microporous membrane manufactured with a resin such as polyolefin containing resin (polyethylene, polypropylene, polybutene and polyvinyl chloride), mixture thereof, copolymer thereof and the like, microporous membrane manufactured with a resin such as polyethyleneterephthalate, poly cycloolefin, polyether sulfon, polyamide, polyimide, polyimideamide, polyaramid, polycycloolefin, nylon, polytetrafluoroethylene and the like, materials wove by polyolefin containing fiber or their non-woven fabric and collective of insulating material particles may be exemplified. Among all, microporous membrane of polyolefin containing resin is preferable, since porous membrane slurry of the invention is superior in coating priority, a membrane thickness of the overall separator is thin, active material ratio in battery is increased and capacity per volume is raised.

Thickness of the organic separator is generally 0.5 to 40 μm, preferably 1 to 30 μm, and more preferably 1 to 20 μm. Within this range, resistance of organic separator in battery becomes small. Further, workability when coating porous membrane slurry on organic separator is good.

In the invention, polyolefin containing resin used as an organic separator material includes homopolymer, copolymer and mixture thereof of polyethylene, polypropylene and the like. As for polyethylene, polyethylene of a low density, a medium density and a high density may be exemplified; and in view of pricking strength or mechanical strength, polyethylene of high density is preferable. Further, in view of providing flexibility, 2 kinds or more of the polyethylene may be mixed. Polymerization catalyst used for the polyethylene is also not particularly limited, and Ziegler-Natta catalyst, Phillips catalyst, metallocene catalyst and the like are exemplified. In view of satisfying both mechanical strength and a high permeability, viscosity average molecular weight of polyethylene is a hundred thousand to 12 million, more preferably 2 hundred thousand to 3 million. Polypropylene exemplifies homopolymer, random copolymer and block copolymer; and one kind or a mixture of two or more kinds can be used. Further, polymerization catalyst is not particularly limited; and includes Ziegler-Natta catalyst, metallocene catalyst and the like. Further, although stereoregularity is also not particularly limited and isotactic, syndiotactic, atactic and the like can be used; isotactic polypropylene is preferably used since it is inexpensive. Further, within a range not to interfere effect of the present invention, polyolefin, other than polyethylene or polypropylene, and an additive agent, such as an antioxidizing agent, a nucleating agent and the like, may suitably added.

Organic separator of polyolefin contained may be manufactured in a well-known and a well-used method. For instance, a dry method wherein polypropylene and polyethylene are melt extruded and film-formed to manufacture a membrane, annealed thereof at a low temperature, their crystalline domain was grown, stretched in this state, and then microporous membrane is formed by stretching amorphous domain, a wet method wherein carbon hydride solvent, the other low molecular material, polypropylene and polyethylene are mixed, and then a film-formed, within this film, in which solvent or low molecular material is aggregated to amorphous phase and beginning to form island phase, the solvent and the low molecular material are removed by using the other volatilizable solvent, and then microporous membrane is formed, and the like may be selected. Among all, in view of lowering resistance and obtaining large void, a dry method is preferable.

The organic separator used in the invention may include an arbitrary filler or fiber compound in view of controlling strength, hardness, heat shrinkage rate. Further, when stacking porous membrane, in object to improve adhesion between organic separator and the porous membrane, and to improve impregnated property of a liquid by lowering surface tension with respect to electrolytic solution, it may be coated with a low molecular compound or a high-molecular compound in advance, or may be electromagnetic radiation treatment such as by ultraviolet rays or plasma treatment such as by corona-plasma gas may be performed in advance. In particular, a high-molecular compound having a polar group, such as carboxylic acid group, hydroxyl group and bisulfonate group, since impregnated property of electrolytic solution is high and adhesion with the porous membrane is obtainable.

Secondary battery separator of the invention is manufactured by stacking the secondary battery porous membrane of the invention on the above-mentioned organic separator.

Although the stacking method is not particularly limited, methods of (I) to (III), described in the above-described manufacturing method of a porous membrane, may be exemplified.

(5) A Secondary Battery

A secondary battery of the invention comprises a positive electrode, a negative electrode, an organic separator and an electrolytic solution, wherein the secondary battery porous membrane is stacked on any of the positive electrode, the negative electrode or the organic separator.

(Electrolytic Solution)

As for an electrolytic solution, an organic electrolytic solution, wherein supporting electrolyte is dissolved in an organic solvent, is used. Lithium salt can be used as a supporting electrolyte. Although said lithium salt is not particularly limited, $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SO_2)NLi$ and the like are exemplified. Among all, $LiPF_6$, $LiClO_4$ and $CF_3SO_3Li$ are preferable, since they are easily solved in a solvent and exhibit a high degree of dissociation. These may be used in a combination of two kinds or more. Higher dissociation degree of supporting electrolyte leads to a higher conductivity degree of lithium ion; and thus conductivity degree of lithium ion may be adjusted according to a kind of supporting electrolyte.

Although an organic solvent used in the electrolytic solution is not particularly limited as long as it can dissolve supporting electrolyte, carbonate such as dimethyl carbonate (DMC), ethylene carbonate (EC), diethyl carbonate (DEC), propylene carbonate (PC), butylene carbonate (BC), methylethyl carbonate (MEC) and the like, ester such as γ-butyrolactone, methyl formate and the like, ether such as 1,2-dimethoxyethane, tetrahydrofuran, sulfur-containing compound such as sulfolane, dimethylsulfoxide and the like, are preferably used. Further, a mixture of the solvents may be used. Among all, carbonate is preferable due to their high dielectric constant and wide electrical potential domain, which is stable. Lower viscosity of a solvent leads to higher conductivity degree of lithium ion; and thus, conductivity degree of lithium ion may be adjusted according to a kind of solvent.

Concentration of supporting electrolyte in electrolytic solution is generally 1 to 30 wt %, preferably 5 to 20 wt %. Further, it is generally used with concentration of 0.5 to 2.5 mol/L, in accordance with a kind of supporting electrolyte. Excessively low or high concentration of supporting electrolyte tends to show low ion conductivity. Low concentration of electrolytic solution leads to a large degree of swelling of polymer particles; and that conductivity degree of lithium ion may be adjusted by concentration of electrolytic solution.

Concrete manufacturing method of a secondary battery may be a method wherein a positive electrode and a negative electrode are superimposed via an organic separator, wind or fold thereof in accordance with battery formation, put into a battery container, and electrolytic solution is injected in a battery container and sealed. Porous membrane of the invention is stacked on any one of positive electrode, negative electrode or organic separator. A method to stack a porous membrane of the invention on positive electrode, negative electrode or organic separator is a method described in above (I) or (II). Further, as is described in the above (III), only a porous membrane is possible to stack on positive electrode, negative electrode or organic separator. Expanded metal, fuse, overcurrent protective device such as PTC device or lead plate may be added when required; and increased pressure inside the battery, excessive charge and discharge and the like may be prevented. A shape of a battery can be any, such as coin type, button type, sheet type, cylindrical type, square type, flattened type and the like.

In a secondary battery of the invention, a porous membrane of the invention is preferably stacked on a surface of electrode active material layer of positive or negative electrode. By stacking a porous membrane of the invention on a surface of electrode active material layer, even when organic separator generates shrinkage by heat, short circuit between positive electrode and negative electrode will not generate and a high stability is maintained. In addition, by stacking a porous membrane of the invention on a surface of electrode active material layer, the porous membrane can function as a separator without an organic separator, a secondary battery can be manufactured at a low cost. Further, even when organic separator is used, voids formed on a surface of separator will not be filled, and that a high rate characteristic may be realized.

EXAMPLES

The present invention will be described by referring to the examples, however the present invention is not limited thereto. Further, the "parts" and "%" in the present examples are based on the weight basis unless otherwise specified. In Examples and Comparative Examples, various physical properties were evaluated as follows.

<Heat-resistant Temperature of Non-conductive Organic Particles (T10 value)>

It was heated in a temperature raising rate of 10° C./min. from 30° C. by a thermobalance under a nitrogen atmosphere; and a heat resistant temperature [° C.] was determined when weight reduction ratio of non-conductive particles reaches 10 wt %.

<Flexibility and Powder Fall Property of an Electrode for Secondary Battery (with Porous Membrane Electrode) or a Separator for Secondary Battery (with Porous Membrane Organic Separator)>

An electrode for secondary battery (with porous membrane electrode) or a separator for secondary battery (with porous membrane organic separator) was cut into rectangular shapes with a width of 1 cm and a length of 5 cm, which was used as a test piece. Keeping the opposite side of porous membrane side of a test piece down on a desk, a stainless rod of 1 mm in diameter was laid along short direction at a center part of length direction (2.5 cm from an end part) and on opposite side of porous membrane side. Placing the stainless steel at a center, a test piece was folded at an angle of 180° with the porous membrane layer on the outside. Ten test pieces were tested; and presence or absence of cracks or powder falls at folded part of a porous membrane layer of each test piece was observed, and said test piece was determined by the following standard. The less cracks and powder falls are, the superior in flexibility and powder fall property of a porous membrane, formed on electrode active material layer or on organic separator.

A: Cracks and powder falls were not observed in all 10 test pieces.

B: Cracks and powder falls were observed in 1 to 3 out of 10 test pieces.

C: Cracks and powder falls were observed in 4 to 6 out of 10 test pieces.

D: Cracks and powder falls were observed in 7 to 9 out of 10 test pieces.

E: Cracks and powder falls were observed in all 10 test pieces.

<Moisture Amount of a Secondary Battery Porous Membrane>

An electrode for secondary battery (with porous membrane electrode) or a separator for secondary battery (with porous membrane organic separator) was cut with a width of 10 cm and a length of 10 cm, which was used as a test piece. The test piece was left for 24 hours at a temperature of 25° C. and a dew point of −60° C. or less. Moisture amount of the test piece was then measured by Karl Fischer's method (JIS K-0068 (2001) a moisture vaporizing method, a vaporizing temperature of 150° C.) using a coulometric titration method moisture meter; and moisture amount per unit volume of the porous membrane was calculated. The less moisture amount per unit volume of the porous membrane was preferable, since it avoids causing a side reaction in battery by moisture, and avoids lowering battery characteristic.

A: less than 1.0 mg/cm$^3$
B: 1.0 mg/cm$^3$ or more and less than 1.5 mg/cm$^3$
C: 1.5 mg/cm$^3$ or more and less than 3.0 mg/cm$^3$
D: 3.0 mg/cm$^3$ or more <Metallic Foreign Particle Content>

Total content (ppm) of metallic foreign particles (Ca, Co, Cr, Cu, Fe, Mg, Ni, Zn) in non-conductive organic particles were quantitative analyzed by the use of inductively-coupled plasma emission spectrometer (ICP-AES by SII Nanotechnology Co.). The less content of metallic foreign particles in non-conductive organic particles was preferable, since it avoid lowering battery characteristic of metallic foreign particles.

A: less than 50 ppm
B: 50 ppm or more and less than 100 ppm
C: 100 ppm or more and less than 200 ppm
D: 200 ppm or more <Cycle Characteristic of a Secondary Battery>

Discharged capacity of 10 cell coin-type batteries were measured in thermostat bath at 60° C. by charging to 4.3V and discharging to 3.0V, repeatedly, by 0.2 C constant current method. An averaged value of the 10 cells was determined a observed value; and a discharged capacity of 5 cycles with respect to a discharged capacity of 60 cycles was calculated in percentage, capacity maintenance ratio was obtained, and a cycle characteristic was evaluated by the following standard. Higher value indicates superior cycle characteristic.

A: 90% or more
B: 80% or more to less than 90%
C: 70% or more to less than 80%
D: 60% or more to less than 70%
E: 60% or less Example 1

(1) Manufacturing Seed Polymer Particles A>

100 parts of styrene, 1.0 part of sodium dodecylbenzenesulfonate, 100 parts of ion-exchange water and 0.5 parts of potassium persulfate were added to a reactor vessel with stirrer, and polymerized at 80° C. for 8 hours. With this, water dispersion of seed polymer particles A having an average particle diameter of 60 nm was obtained.

<(2) Manufacturing Seed Polymer Particles B>

2 parts of water dispersion of seed polymer particles A, obtained in the above step (1) by solid content standard (i.e. weight standard of seed polymer particles A), 0.2 parts of sodium dodecylbenzenesulfonate, 0.5 parts of potassium persulfate, and 100 parts of ion-exchange water were added in a reactor vessel with stirrer, mixed to obtain a mixture, and raised its temperature to 80° C. On the other hand, 97 parts of styrene, 3 parts of methacrylic acid, 4 parts of t-dodecylmercaptan, 0.5 parts of sodium dodecylbenzenesulfonate and 100 parts of ion-exchange water were mixed and dispersion of monomer mixture was prepared. Dispersion of this monomer mixture was constantly added to the above mixture for 4 hours, and polymerized. Temperature of reaction system during constantly adding dispersion of monomer mixture was maintained at 80° C.; and the reaction was progressed. After the constant addition, the reaction was continuously progressed for 3 hours at 90° C.

With this, water dispersion of seed polymer particles B having an average particle diameter of 200 nm was obtained.

<(3) Manufacturing Non-conductive Organic Particles>

Next, 10 parts of water dispersion of seed polymer particles B, obtained in the above step (2) by solid content standard (i.e. weight standard of seed polymer particles B), 88.5 parts of monomer mixture (mixture of divinylbenzen and ethylvinyl benzene, monomer mixture ratio; divinylbenzen/ethylvinyl benzene=60/40, New Nippon Steel Chemical Co., Ltd. made, product name; DVB-570), 1.0 part of sodium dodecylbenzenesulfonate, 5.0 parts of t-butyl peroxy-2-ethylhexanoate (Nippon Oil & Fats Co., Ltd., product name; perbutyl O) as polymeric initiator and 200 parts of ion-exchange water were added to reactor vessel with stirrer, stirred for 12 hours at 35° C.; and monomer mixture and polymeric initiator was completely absorbed to seed polymer particles B. Next, the above was polymerized for 4 hours at 90° C., 1.5 parts of glycidyl methacrylate was added maintaining the temperature at 90° C., and left for 15 minutes. Then, 0.1 part of 2,2'-azobis[2-methyl-N-{1,1-bis (hydroxymethyl)-2-hydroxyethyl}propion amide] (Wako Pure Chemical Industries, Ltd. made, product name; VA-086) solved in 10 parts of ion-exchange water was added as an initiator, and continuously polymerized for 3 hours.

Subsequently, unreacted monomer was removed by introducing steam.

With this, water dispersion of non-conductive organic particle having an average particle diameter of 0.4 μm was obtained.

Monomer (styrene, methacrylic acid, divinylbenzen, ethylvinyl benzene and glycidyl methacrylate) compositions used from formation of seed polymer particles to obtaining non-conductive organic particles, heat resistant temperatures (T10 value) of non-conductive organic particles, contents of functional groups and metallic foreign particle contents are shown in Table 1.

<(4) Manufacturing a Binder>

70 parts of ion-exchange water, 0.4 parts of sodium dodecylbenzenesulfonate and 0.3 parts of potassium persulfate were added to a reactor vessel with stirrer, and mixed to obtain a mixture; and then its temperature was raised to 60° C.

On the other hand, 50 parts of ion-exchange water, 0.8 parts of sodium dodecylbenzenesulfonate, 77.7 parts of 2-ethylhexyl acrylate, 20 parts of acrylonitril, 2.3 parts of 2-acrylamide-2-methylpropanesulfonic acid were mixed to obtain monomer mixture.

This monomer mixture was constantly added to the above-described mixture for 4 hours. Temperature of reaction system during the constant addition, was maintained at 60° C.; and the reaction was progressed. After the constant addition, the reaction was continuously progressed for 3 hours at 70° C.; and aqueous dispersion including binder (binder aqueous dispersion) was obtained.

After cooling the obtained binder aqueous dispersion to 25° C., aqueous ammonia was added to the same and its pH was adjusted to 7, then unreacted monomers were removed by introducing steam. Subsequently and promptly, 0.25 parts of ethylenediaminetetraacetate was added with respect to 100 parts of binder solid content, mixed thereof, and filtrated thereof with a stainless-steel metallic mesh of 200 mesh (aperture size of around 77 μm), while further performing solid content density adjustment with ion-exchange water. Then, a binder aqueous dispersion for porous membrane, having an average particle diameter of 100 nm and solid content concentration of 40%, was obtained.

In said binder for porous membrane, polymerized unit content ratio of vinyl monomer (2-acrylamide-2-methylpropanesulfonic) having hydrophilic group was 2.3%, the same of (meth)acrylic ester monomer was 77.7%, and the same of α,β-unsaturated nitrile monomer was 20%.

<(5) Manufacturing a Porous Membrane Slurry>

As for a thickener, 1% aqueous solution was prepared by using carboxymethylcellulose (Daicel 1220 by Daicel chemical industries, Ltd.), in which degree of etherification is 0.8 to 1.0 and 1% aqueous viscosity is 10 to 20 mPa·s.

Water dispersion of non-conductive organic particles obtained in the above step (3), binder aqueous dispersion for a porous membrane obtained in the above step (4), and 1% aqueous solution of carboxymethylcellulose were mixed in order to make their solid content weight ratio to be 83.1: 12.3:4.6. water as solvent was further added thereof, dispersed using bead mill, and porous membrane slurry was obtained. Note that a content of raw materials (a total of solid contents) other than water in the porous membrane slurry was 50 wt %.

<(6) Manufacturing a Positive Electrode>

PVDF (polyvinylidene fluoride by Kureha Chemical Industry Co., Ltd., product name: KF-1100) as binder for electrode was added to 95 parts of manganate lithium, having spinel structure as positive electrode active material, so as to make its solid content amount to 3 parts. 2 parts of acetylene black and 20 parts of N-methylpyrrolidone were further added, mixed thereof with a planetary mixer, then a slurry electrode composition for positive electrode (slurry for positive electrode) was obtained. This slurry for positive electrode was coated on one-side of aluminum foil having 18 μm thickness, dried for 3 hours at 120° C., roll pressed, and then positive electrode having positive electrode active material layer with 100 μm total thickness was obtained.

<(7) Manufacturing a Negative Electrode>

98 parts of graphite having particle diameter of 20 μm and specific surface area of 4.2 m²/g as negative electrode active material and 1 part, when converted to solid content, of SBR (styrene-butadiene rubber, a glass-transition temperature of −10° C.) as binder for electrode were mixed. 1 part of carboxymethylcellulose was further mixed to the mixture and mixed, and water was further added to the solvent and mixed thereof with a planetary mixer, and a slurry electrode composition for negative electrode (slurry for negative electrode) was prepared. This slurry for negative electrode was coated on one-side of copper foil having thickness of 18 μm, dried for 3 hours at 110° C., roll pressed, and negative electrode having negative electrode active material layer with 60 μm total thickness was obtained.

<(8) Manufacturing a Separator for Secondary Battery (Organic Separator with Porous Membrane)>

Polypropylene made separator (55% of porosity and 25 μm of thickness) of a single layer manufactured by a dry method was prepared by an organic separator. On a side of this organic separator, a porous membrane slurry obtained in step (5) was coated using wire bar, making its thickness 5 μm after drying; then a slurry layer was obtained. This slurry layer was dried for 10 minutes at 50° C., forming a porous membrane. Subsequently, on the other side of organic separator, a porous membrane was formed likewise. Then an organic separator with porous membranes having said porous membranes on both sides was obtained.

<(9) Manufacturing a Secondary Battery Having a Separator for Secondary Battery (Organic Separator with Porous Membrane)>

Positive electrode obtained in the above step (6) was cut out in a circular form having a diameter of 13 mm; then a circular formed positive electrode was obtained. Negative electrode obtained in the above step (7) was cut out in a circular form having a diameter of 14 mm; then a circular formed negative electrode was obtained. Further, organic separator with porous membrane obtained in the above step (8) was cut out in a circular form having a diameter of 18 mm; and a circular formed organic separator with porous membrane was obtained.

On an inside bottom face of stainless steel made coin-type packaging container, provided with polypropylene made packing, a circular formed positive electrode was set, a circular formed organic separator with porous membrane was set thereon, a circular formed negative electrode was further set thereon, and they were stored in a container. The circular formed positive electrode was set, in which its aluminum foil side faced bottom face of the packaging container, while its positive electrode active material layer side faced upper side. The circular formed negative electrode was set, in which its negative electrode active material layer side faced a circular formed organic separator with porous membrane side, while its copper foil side faced upper side. This container was vacuum dried at 105° C. for 24 hours, which made further progress in cross-linkage between binder and non-conductive organic fine particles, further removing residual moisture within the system.

Electrolytic solution was injected in the container without remaining air. The packaging container was fixed by covering with a cap made of stainless steel with a thickness of 0.2 mm via a polypropylene packing, followed by sealing a battery can to prepare a lithium ion secondary battery (coin cell CR2032) having a diameter of 20 mm and a thickness of approximately 3.2 mm. As for an electrolytic solution, a solution, wherein $LiPF_6$ was dissolved with a concentration of 1 mole/litter in a mixed solvent mixing ethylene carbonate (EC) and diethyl carbonate (DEC) in a ratio of EC:DEC=1:2 (volume ratio at 20° C.), was used.

<(10) Evaluation>

Flexibility, powder fall property and moisture amount of the obtained organic separator with porous membrane and cycle characteristic of the obtained secondary battery were evaluated. Results are shown in Table 1.

Example 2

Instead of non-conductive organic particles obtained in steps (1) to (3) in Example 1, the following non-conductive organic particles were used. Further, instead of a binder for porous membrane obtained in step (4) in Example 1, the following binder for porous membrane was used. The same procedures were performed as in Example 1, except manufacturing a porous membrane slurry using the non-conductive organic particles and the binder for porous membrane; and an organic separator with porous membrane and a secondary battery were obtained and evaluated. Results are shown in Table 1.

<Manufacturing Non-Conductive Organic Particles>

Next, 10 parts of water dispersion of seed polymer particles B, obtained in the above step (2) by solid content standard (i.e. weight standard of seed polymer particles B), 89.6 parts of monomer mixture (mixture of divinylbenzen and ethylvinyl benzene, monomer mixture ratio: divinylbenzen/ethylvinyl benzene=60/40, New Nippon Steel Chemical Co., Ltd. made, product name: DVB-570), 1.0 part of sodium dodecylbenzenesulfonate, 5.0 parts of t-butyl peroxy-2-ethylhexanoate (Nippon Oil & Fats Co., Ltd., product name: perbutyl O) as polymeric initiator and 200 parts of ion-exchange water were added to reactor vessel with stirrer, stirred for 12 hours at 35° C.; and monomer mixture and polymeric initiator was completely absorbed to seed polymer particles B. Next, the above was polymerized for 4 hours at 90° C., 0.4 parts of glycidyl methacrylate was added maintaining the temperature at 90° C., and left for minutes. Then, 0.1 part of 2,2'-azobis[2-methyl-N-{1,1-bis (hydroxymethyl)-2-hydroxyethyl}propion amide] (Wako Pure Chemical Industries, Ltd. made, product name: VA-086) solved in 10 parts of ion-exchange water was added as an initiator, and continuously polymerized for 3 hours.

Subsequently, unreacted monomer was removed by introducing steam.

With this, water dispersion of non-conductive organic particle having an average particle diameter of 0.4 μm was obtained.

Monomer (styrene, methacrylic acid, divinylbenzen, ethylvinyl benzene and glycidyl methacrylate) compositions used from formation of seed polymer particles to obtaining non-conductive organic particles, heat resistant temperatures (T10 value) of non-conductive organic particles, contents of functional groups and metallic foreign particle contents are shown in Table 1.

<Manufacturing a Binder>

70 parts of ion-exchange water, 0.4 parts of sodium dodecylbenzenesulfonate and 0.3 parts of potassium persulfate were added to a reactor vessel with stirrer, and mixed to obtain a mixture; and then its temperature was raised to 60° C.

On the other hand, 50 parts of ion-exchange water, 0.8 parts of sodium dodecylbenzenesulfonate, 78.4 parts of 2-ethylhexyl acrylate, 21 parts of acrylonitril, 0.6 parts of 2-acrylamide-2-methylpropanesulfonic acid were mixed to obtain monomer mixture.

This monomer mixture was constantly added to the above-described mixture for 4 hours. Temperature of reaction system during the constant addition, was maintained at 60° C.; and the reaction was progressed. After the constant addition, the reaction was continuously progressed for 3 hours at 70° C.; and aqueous dispersion including binder (binder aqueous dispersion) was obtained.

After cooling the obtained binder aqueous dispersion to 25° C., aqueous ammonia was added to the same and its pH was adjusted to 7, then unreacted monomers were removed by introducing steam. Subsequently and promptly, 0.25 parts of ethylenediaminetetraacetate was added with respect to 100 parts of binder solid content, mixed thereof, and filtrated thereof with a stainless-steel metallic mesh of 200 mesh (aperture size of around 77 μm), while further performing solid content density adjustment with ion-exchange water. Then, a binder aqueous dispersion for porous membrane, having an average particle diameter of 100 nm and solid content concentration of 40%, was obtained.

In said binder for porous membrane, polymerized unit content ratio of vinyl monomer (2-acrylamide-2-methylpropanesulfonic) having hydrophilic group was 0.6%, the same of (meth)acrylic ester monomer was 78.4%, and the same of α,β-unsaturated nitrile monomer was 21%.

Example 3

Instead of non-conductive organic particles obtained in steps (1) to (3) in Example 1, the following non-conductive organic particles were used. Further, instead of a binder for porous membrane obtained in step (4) in Example 1, the following binder for porous membrane was used. The same procedures were performed as in Example 1, except manufacturing a porous membrane slurry using the non-conductive organic particles and the binder for porous membrane; and an organic separator with porous membrane and a secondary battery were obtained and evaluated. Results are shown in Table 1.

<Manufacturing Non-Conductive Organic Particles>

Next, 10 parts of water dispersion of seed polymer particles B, obtained in the above step (2) by solid content standard (i.e. weight standard of seed polymer particles B), 87.2 parts of monomer mixture (mixture of divinylbenzen and ethylvinyl benzene, monomer mixture ratio: divinylbenzen/ethylvinyl benzene=60/40 by New Nippon Steel Chemical Co., Ltd., product name: DVB-570), 1.0 part of sodium dodecylbenzenesulfonate, 5.0 parts of t-butyl peroxy-2-ethylhexanoate (Nippon Oil & Fats Co., Ltd., product name: perbutyl O) as polymeric initiator and 200 parts of ion-exchange water were added to reactor vessel with stirrer, stirred for 12 hours at 35° C.; and monomer mixture and polymeric initiator were completely absorbed to seed polymer particles B. Next, the above was polymerized for 4 hours at 90° C., 2.8 parts of glycidyl methacrylate was added maintaining the temperature at 90° C., and left for 15 minutes. Then, 0.1 part of 2,2'-azobis[2-methyl-N-{1,1-bis(hydroxymethyl)-2-hydroxyethyl}propion amide] (product name: VA-086 by Wako Pure Chemical Industries, Ltd.) solved in 10 parts of ion-exchange water was added as an initiator, and continuously polymerized for 3 hours.

Subsequently, unreacted monomer was removed by introducing steam.

With this, water dispersion of non-conductive organic particle having an average particle diameter of 0.4 µm was obtained.

Monomer (styrene, methacrylic acid, divinylbenzen, ethylvinyl benzene and glycidyl methacrylate) compositions used from formation of seed polymer particles to obtaining non-conductive organic particles, heat resistant temperatures (T10 value) of non-conductive organic particles, contents of functional groups and metallic foreign particle contents are shown in Table 1.

<(4) Manufacturing a Binder>

70 parts of ion-exchange water, 0.4 parts of sodium dodecylbenzenesulfonate and 0.3 parts of potassium persulfate were added to a reactor vessel with stirrer, and mixed to obtain a mixture; and then its temperature was raised to 60° C.

On the other hand, 50 parts of ion-exchange water, 0.8 parts of sodium dodecylbenzenesulfonate, 76.5 parts of 2-ethylhexyl acrylate, 19 parts of acrylonitril, 4.5 parts of 2-acrylamide-2-methylpropanesulfonic acid were mixed to obtain monomer mixture.

This monomer mixture was constantly added to the above-described mixture for 4 hours. Temperature of reaction system during the constant addition, was maintained at 60° C.; and the reaction was progressed. After the constant addition, the reaction was continuously progressed for 3 hours at 70° C.; and aqueous dispersion including binder (binder aqueous dispersion) was obtained.

After cooling the obtained binder aqueous dispersion to 25° C., aqueous ammonia was added to the same and its pH was adjusted to 7, then unreacted monomers were removed by introducing steam. Subsequently and promptly, 0.25 parts of ethylenediaminetetraacetate was added with respect to 100 parts of binder solid content, mixed thereof, and filtrated thereof with a stainless-steel metallic mesh of 200 mesh (aperture size of around 77 µm), while further performing solid content density adjustment with ion-exchange water. Then, a binder aqueous dispersion for porous membrane, having an average particle diameter of 100 nm and solid content concentration of 40%, was obtained.

In said binder for porous membrane, polymerized unit content ratio of vinyl monomer (2-acrylamide-2-methylpropanesulfonic) having hydrophilic group was 4.5%, the same of (meth)acrylic ester monomer was 76.5%, and the same of α,β-unsaturated nitrile monomer was 19%.

Example 4

The same procedures were performed as in Example 1, except manufacturing a porous membrane slurry using the following binder for porous membrane, instead of a binder for porous membrane obtained in step (4) in Example 1; and an organic separator with porous membrane and a secondary battery were obtained and evaluated. Results are shown in Table 1.

<Manufacturing a Binder>

70 parts of ion-exchange water, 0.4 parts of sodium dodecylbenzenesulfonate and 0.3 parts of potassium persulfate were added to a reactor vessel with stirrer, and mixed to obtain a mixture; and then its temperature was raised to 60° C.

On the other hand, 50 parts of ion-exchange water, 0.8 parts of sodium dodecylbenzenesulfonate, 91 parts of 2-ethylhexyl acrylate, 7 parts of acrylonitril, 2 parts of 2-acrylamide-2-methylpropanesulfonic acid were mixed to obtain monomer mixture.

This monomer mixture was constantly added to the above-described mixture for 4 hours. Temperature of reaction system during the constant addition, was maintained at 60° C.; and the reaction was progressed. After the constant addition, the reaction was continuously progressed for 3 hours at 70° C.; and aqueous dispersion including binder (binder aqueous dispersion) was obtained.

After cooling the obtained binder aqueous dispersion to 25° C., aqueous ammonia was added to the same and its pH was adjusted to 7, then unreacted monomers were removed by introducing steam. Subsequently and promptly, 0.25 parts of ethylenediaminetetraacetate was added with respect to 100 parts of binder solid content, mixed thereof, and filtrated thereof with a stainless-steel metallic mesh of 200 mesh (aperture size of around 77 µm), while further performing solid content density adjustment with ion-exchange water. Then, a binder aqueous dispersion for porous membrane, having an average particle diameter of 100 nm and solid content concentration of 40%, was obtained.

In said binder for porous membrane, polymerized unit content ratio of vinyl monomer (2-acrylamide-2-methylpropanesulfonic) having hydrophilic group was 2%, the same of (meth)acrylic ester monomer was 91%, and the same of α,β-unsaturated nitrile monomer was 7%.

Example 5

The same procedures were performed as in Example 1, except manufacturing a porous membrane slurry using the following binder for porous membrane, instead of a binder for porous membrane obtained in step (4) in Example 1; and an organic separator with porous membrane and a secondary battery were obtained and evaluated. Results are shown in Table 1.

<Manufacturing a Binder>

70 parts of ion-exchange water, 0.4 parts of sodium dodecylbenzenesulfonate and 0.3 parts of potassium persulfate were added to a reactor vessel with stirrer, and mixed to obtain a mixture; and then its temperature was raised to 60° C.

On the other hand, 50 parts of ion-exchange water, 0.8 parts of sodium dodecylbenzenesulfonate, 67 parts of 2-ethylhexyl acrylate, 30 parts of acrylonitril, 3 parts of 2-acrylamide-2-methylpropanesulfonic acid were mixed to obtain monomer mixture.

This monomer mixture was constantly added to the above-described mixture for 4 hours. Temperature of reaction system during the constant addition, was maintained at 60° C.; and the reaction was progressed. After the constant addition, the reaction was continuously progressed for 3 hours at 70° C.; and aqueous dispersion including binder (binder aqueous dispersion) was obtained.

After cooling the obtained binder aqueous dispersion to 25° C., aqueous ammonia was added to the same and its pH was adjusted to 7, then unreacted monomers were removed by introducing steam. Subsequently and promptly, 0.25 parts of ethylenediaminetetraacetate was added with respect to 100 parts of binder solid content, mixed thereof, and filtrated thereof with a stainless-steel metallic mesh of 200 mesh (aperture size of around 77 μm), while further performing solid content density adjustment with ion-exchange water. Then, a binder aqueous dispersion for porous membrane, having an average particle diameter of 100 nm and solid content concentration of 40%, was obtained.

In said binder for porous membrane, polymerized unit content ratio of vinyl monomer (2-acrylamide-2-methylpropanesulfonic) having hydrophilic group was 3%, the same of (meth)acrylic ester monomer was 67%, and the same of α,β-unsaturated nitrile monomer was 30%.

Example 6

The same procedures were performed as in Example 1, except manufacturing a porous membrane slurry using the following binder for porous membrane, instead of a binder for porous membrane obtained in step (4) in Example 1; and an organic separator with porous membrane and a secondary battery were obtained and evaluated. Results are shown in Table 1.

<Manufacturing a Binder>

70 parts of ion-exchange water, 0.4 parts of sodium dodecylbenzenesulfonate and 0.3 parts of potassium persulfate were added to a reactor vessel with stirrer, and mixed to obtain a mixture; and then its temperature was raised to 60° C.

On the other hand, 50 parts of ion-exchange water, 0.8 parts of sodium dodecylbenzenesulfonate, 78 parts of 2-ethylhexyl acrylate, 20.2 parts of acrylonitril, 1.8 parts of styrenesulfonate were mixed to obtain monomer mixture.

This monomer mixture was constantly added to the above-described mixture for 4 hours. Temperature of reaction system during the constant addition, was maintained at 60° C.; and the reaction was progressed. After the constant addition, the reaction was continuously progressed for 3 hours at 70° C.; and aqueous dispersion including binder (binder aqueous dispersion) was obtained.

After cooling the obtained binder aqueous dispersion to 25° C., aqueous ammonia was added to the same and its pH was adjusted to 7, then unreacted monomers were removed by introducing steam. Subsequently and promptly, 0.25 parts of ethylenediaminetetraacetate was added with respect to 100 parts of binder solid content, mixed thereof, and filtrated thereof with a stainless-steel metallic mesh of 200 mesh (aperture size of around 77 μm), while further performing solid content density adjustment with ion-exchange water. Then, a binder aqueous dispersion for porous membrane, having an average particle diameter of 100 nm and solid content concentration of 40%, was obtained.

In said binder for porous membrane, polymerized unit content ratio of vinyl monomer (styrenesulfonate) having hydrophilic group was 1.8%, the same of (meth)acrylic ester monomer was 78%, and the same of α,β-unsaturated nitrile monomer was 20.2%.

Example 7

The same procedures were performed as in Example 1, except manufacturing a porous membrane slurry using the following binder for porous membrane, instead of a binder for porous membrane obtained in step (4) in Example 1; and an organic separator with porous membrane and a secondary battery were obtained and evaluated. Results are shown in Table 1.

<Manufacturing a Binder>

70 parts of ion-exchange water, 0.4 parts of sodium dodecylbenzenesulfonate and 0.3 parts of potassium persulfate were added to a reactor vessel with stirrer, and mixed to obtain a mixture; and then its temperature was raised to 60° C.

On the other hand, 50 parts of ion-exchange water, 0.8 parts of sodium dodecylbenzenesulfonate, 78.5 parts of 2-ethylhexyl acrylate, 20.6 parts of acrylonitril, 0.9 parts of meta-allylsulphonate were mixed to obtain monomer mixture.

This monomer mixture was constantly added to the above-described mixture for 4 hours. Temperature of reaction system during the constant addition, was maintained at 60° C.; and the reaction was progressed. After the constant addition, the reaction was continuously progressed for 3 hours at 70° C.; and aqueous dispersion including binder (binder aqueous dispersion) was obtained.

After cooling the obtained binder aqueous dispersion to 25° C., aqueous ammonia was added to the same and its pH was adjusted to 7, then unreacted monomers were removed by introducing steam. Subsequently and promptly, 0.25 parts of ethylenediaminetetraacetate was added with respect to 100 parts of binder solid content, mixed thereof, and filtrated thereof with a stainless-steel metallic mesh of 200 mesh (aperture size of around 77 μm), while further performing solid content density adjustment with ion-exchange water. Then, a binder aqueous dispersion for porous membrane, having an average particle diameter of 100 nm and solid content concentration of 40%, was obtained.

In said binder for porous membrane, polymerized unit content ratio of vinyl monomer (meta-allylsulphonate) having hydrophilic group was 0.9%, the same of (meth)acrylic ester monomer was 78.5%, and the same of a, 6-unsaturated nitrile monomer was 20.6%.

Example 8

The same procedures were performed as in Example 1, except manufacturing a porous membrane slurry using the following binder for porous membrane, instead of a binder for porous membrane obtained in step (4) in Example 1; and an organic separator with porous membrane and a secondary battery were obtained and evaluated. Results are shown in Table 1.

<Manufacturing a Binder>

70 parts of ion-exchange water, 0.4 parts of sodium dodecylbenzenesulfonate and 0.3 parts of potassium persulfate were added to a reactor vessel with stirrer, and mixed to obtain a mixture; and then its temperature was raised to 60° C.

On the other hand, 50 parts of ion-exchange water, 0.8 parts of sodium dodecylbenzenesulfonate, 77.9 parts of 2-ethylhexyl acrylate, 20.1 parts of acrylonitril, 2.0 parts of 2-(meth)acryloxyethyl phosphate were mixed to obtain monomer mixture.

This monomer mixture was constantly added to the above-described mixture for 4 hours. Temperature of reaction system during the constant addition, was maintained at 60° C.; and the reaction was progressed. After the constant addition, the reaction was continuously progressed for 3 hours at 70° C.; and aqueous dispersion including binder (binder aqueous dispersion) was obtained.

After cooling the obtained binder aqueous dispersion to 25° C., aqueous ammonia was added to the same and its pH was adjusted to 7, then unreacted monomers were removed by introducing steam. Subsequently and promptly, 0.25 parts of ethylenediaminetetraacetate was added with respect to 100 parts of binder solid content, mixed thereof, and filtrated thereof with a stainless-steel metallic mesh of 200 mesh (aperture size of around 77 μm), while further performing solid content density adjustment with ion-exchange water. Then, a binder aqueous dispersion for porous membrane, having an average particle diameter of 100 nm and solid content concentration of 40%, was obtained.

In said binder for porous membrane, polymerized unit content ratio of vinyl monomer (2-(meth)acryloxyethyl phosphate) having hydrophilic group was 2.0%, the same of (meth)acrylic ester monomer was 77.9%, and the same of α,β-unsaturated nitrile monomer was 20.1%.

Example 9

The same procedures were performed as in Example 1, except the following non-conductive organic particles were used, instead of non-conductive organic particles obtained in steps (1) to (3), to make a porous membrane slurry; and an organic separator with porous membrane and a secondary battery were obtained and evaluated. Results are shown in Table 1.

<Manufacturing Non-conductive Organic Particles>

Next, 10 parts of water dispersion of seed polymer particles B, obtained in the above step (2) by solid content standard (i.e. weight standard of seed polymer particles B), 89.0 parts of monomer mixture (mixture of divinylbenzen and ethylvinyl benzene, monomer mixture ratio: divinylbenzen/ethylvinyl benzene=60/40, New Nippon Steel Chemical Co., Ltd. made, product name: DVB-570), 1.0 part of sodium dodecylbenzenesulfonate, 5.0 parts of t-butyl peroxy-2-ethylhexanoate (Nippon Oil & Fats Co., Ltd., product name: perbutyl O) as polymeric initiator and 200 parts of ion-exchange water were added to reactor vessel with stirrer, stirred for 12 hours at 35° C.; and monomer mixture and polymeric initiator was completely absorbed to seed polymer particles B. Next, the above was polymerized for 4 hours at 90° C., 1.0 part of allylglycidylether was added maintaining the temperature at 90° C., and left for 15 minutes. Then, 0.1 part of 2,2'-azobis[2-methyl-N-{1,1-bis(hydroxymethyl)-2-hydroxyethyl}propion amide] (Wako Pure Chemical Industries, Ltd. made, product name: VA-086) solved in 10 parts of ion-exchange water was added as an initiator, and continuously polymerized for 3 hours.

Subsequently, unreacted monomer was removed by introducing steam.

With this, water dispersion of non-conductive organic particle having an average particle diameter of 0.4 μm was obtained.

Monomer (styrene, methacrylic acid, divinylbenzen, ethylvinyl benzene and allylglycidylether) compositions used from formation of seed polymer particles to obtaining non-conductive organic particles, heat resistant temperatures (T10 value) of non-conductive organic particles, contents of functional groups and metallic foreign particle contents are shown in Table 1.

Example 10

The same procedures were performed as in Example 1, except the following non-conductive organic particles were used, instead of non-conductive organic particles obtained in steps (1) to (3), to make a porous membrane slurry; and an organic separator with porous membrane and a secondary battery were obtained and evaluated. Results are shown in Table 1.

<Manufacturing Non-Conductive Organic Particles>

Next, 10 parts of water dispersion of seed polymer particles B, obtained in the above step (2) by solid content standard (i.e. weight standard of seed polymer particles B), 88.3 parts of monomer mixture (mixture of divinylbenzen and ethylvinyl benzene, monomer mixture ratio: divinylbenzen/ethylvinyl benzene=60/40, New Nippon Steel Chemical Co., Ltd. made, product name: DVB-570), 1.0 part of sodium dodecylbenzenesulfonate, 5.0 parts of t-butyl peroxy-2-ethylhexanoate (Nippon Oil & Fats Co., Ltd., product name: perbutyl O) as polymeric initiator and 200 parts of ion-exchange water were added to reactor vessel with stirrer, stirred for 12 hours at 35° C.; and monomer mixture and polymeric initiator was completely absorbed to seed polymer particles B. Next, the above was polymerized for 4 hours at 90° C., 1.0 part of 3-methacryloxy-triethoxysilan was added maintaining the temperature at 90° C., and left for 15 minutes. Then, 0.1 part of 2,2'-azobis[2-methyl-N-{1,1-bis(hydroxymethyl)-2-hydroxyethyl}propion amide] (Wako Pure Chemical Industries, Ltd. made, product name: VA-086) solved in 10 parts of ion-exchange water was added as an initiator, and continuously polymerized for 3 hours.

Subsequently, unreacted monomer was removed by introducing steam.

With this, water dispersion of non-conductive organic particle having an average particle diameter of 0.4 μm was obtained.

Monomer (styrene, methacrylic acid, divinylbenzen, ethylvinyl benzene and 3-methacryloxy-triethoxysilan) compositions used from formation of seed polymer particles to obtaining non-conductive organic particles, heat resistant temperatures (T10 value) of non-conductive organic particles, contents of functional groups and metallic foreign particle contents are shown in Table 1.

Example 11

The same procedures were performed as in Example 1, except the following non-conductive organic particles were used, instead of non-conductive organic particles obtained in steps (1) to (3), to make a porous membrane slurry; and an organic separator with porous membrane and a secondary battery were obtained and evaluated. Results are shown in Table 1.

<Manufacturing Non-Conductive Organic Particles>

Next, 10 parts of water dispersion of seed polymer particles B, obtained in the above step (2) by solid content standard (i.e. weight standard of seed polymer particles B), 85.7 parts of monomer mixture (mixture of divinylbenzen and ethylvinyl benzene, monomer mixture ratio; divinylbenzen/ethylvinyl benzene=60/40, New Nippon Steel Chemical Co., Ltd. made, product name; DVB-570), 1.0 part of sodium dodecylbenzenesulfonate, 5.0 parts of t-butyl peroxy-2-ethylhexanoate (Nippon Oil & Fats Co., Ltd., product name; perbutyl O) as polymeric initiator and 200 parts of ion-exchange water were added to reactor vessel with stirrer, stirred for 12 hours at 35° C.; and monomer mixture and polymeric initiator was completely absorbed to seed polymer particles B. Next, the above was polymerized for 4 hours at 90° C., 4.3 parts of glycidyl methacrylate was added maintaining the temperature at 90° C., and left for 15 minutes. Then, 0.1 part of 2,2'-azobis[2-methyl-N-{1,1-bis(hydroxymethyl)-2-hydroxyethyl}propion amide] (Wako Pure Chemical Industries, Ltd. made, product name; VA-086) solved in 10 parts of ion-exchange water was added as an initiator, and continuously polymerized for 3 hours.

Subsequently, unreacted monomer was removed by introducing steam.

With this, water dispersion of non-conductive organic particle having an average particle diameter of 0.4 μm was obtained.

Monomer (styrene, methacrylic acid, divinylbenzen, ethylvinyl benzene and glycidyl methacrylate) compositions used from formation of seed polymer particles to obtaining non-conductive organic particles, heat resistant temperatures (T10 value) of non-conductive organic particles, contents of functional groups and metallic foreign particle contents are shown in Table 1.

Example 12

The same procedures were performed as in Example 1, except manufacturing a porous membrane slurry using the following binder for porous membrane, instead of a binder for porous membrane obtained in step (4) in Example 1; and an organic separator with porous membrane and a secondary battery were obtained and evaluated. Results are shown in Table 1.

<Manufacturing a Binder>

70 parts of ion-exchange water, 0.4 parts of sodium dodecylbenzenesulfonate and 0.3 parts of potassium persulfate were added to a reactor vessel with stirrer, and mixed to obtain a mixture; and then its temperature was raised to 60° C.

On the other hand, 50 parts of ion-exchange water, 0.8 parts of sodium dodecylbenzenesulfonate, 75 parts of 2-ethylhexyl acrylate, 17 parts of acrylonitril and 8.0 parts of 2-acrylamide-2-methylpropanesulfonic acid were mixed to obtain monomer mixture.

This monomer mixture was constantly added to the above-described mixture for 4 hours. Temperature of reaction system during the constant addition, was maintained at 60° C.; and the reaction was progressed. After the constant addition, the reaction was continuously progressed for 3 hours at 70° C.; and aqueous dispersion including binder (binder aqueous dispersion) was obtained.

After cooling the obtained binder aqueous dispersion to 25° C., aqueous ammonia was added to the same and its pH was adjusted to 7, then unreacted monomers were removed by introducing steam. Subsequently and promptly, 0.25 parts of ethylenediaminetetraacetate was added with respect to 100 parts of binder solid content, mixed thereof, and filtrated thereof with a stainless-steel metallic mesh of 200 mesh (aperture size of around 77 μm), while further performing solid content density adjustment with ion-exchange water. Then, a binder aqueous dispersion for porous membrane, having an average particle diameter of 100 nm and solid content concentration of 40%, was obtained.

In said binder for porous membrane, polymerized unit content ratio of vinyl monomer (2-acrylamide-2-methylpropanesulfonic) having hydrophilic group was 8.0%, the same of (meth)acrylic ester monomer was 75%, and the same of α,β-unsaturated nitrile monomer was 17%.

Example 13

The same procedures were performed as in Example 1, except manufacturing a porous membrane slurry using the following binder for porous membrane, instead of a binder for porous membrane obtained in step (4) in Example 1; and an organic separator with porous membrane and a secondary battery were obtained and evaluated. Results are shown in Table 1.

<Manufacturing a Binder>

5 parts of styrene, 10 parts of butadiene, 3 parts of polyoxyethylene alkyl ether (Kao Corporation made: Emulgen 1150S-60) and 70 parts of ion-exchange water were added to polymerization tank A and sufficiently stirred. Then, temperature was set at 70° C., 0.3 parts of water-soluble azo polymeric initiator (Wako Pure Chemical Industries, Ltd. made: VA-086) as polymeric initiator and 10 parts of ion-exchange water were added, and stirred for 120 minutes.

On the other hand, 45.8 parts of styrene, 36.9 parts of butadiene, 2.3 parts of 2-acrylamide-2-methylpropanesulfonic acid, 10 parts of polyoxyethylene alkyl ether and 30 parts of ion-exchange water were added to the other polymerization tank B and stirred to manufacture an emulsion.

Then, the manufactured emulsion was continuously added from polymerization tank B to polymerization tank A for about 300 minutes, and stirred for 180 minutes; and it was cooled when monomer consumption became 95%, which lead to a completion of the reaction. With this, a binder aqueous dispersion of binder for a porous membrane having a solid content concentration of 40% and a number average particle diameter of 150 nm was obtained.

In said binder for porous membrane, polymerized unit content ratio of vinyl monomer (2-acrylamide-2-methylpropanesulfonic acid) having hydrophilic acid group was 2.3%, the same of (meth)acrylic ester monomer and the same of α,β-unsaturated nitrile monomer were both 0%.

Example 14

A porous membrane slurry obtained in step (5) of Example 1 was coated on a surface of negative electrode active material layer side of the negative electrode obtained in step (7) of Example 1, in order to make the negative electrode active material layer completely covered and a thickness of dried porous membrane to 5 μm; and a slurry layer was obtained. The slurry layer was dried at 50° C. for 10 minutes, a porous membrane was formed; and negative electrode with porous membrane was obtained. The obtained negative electrode with porous membrane had a layer composition of (a porous membrane)/(a negative electrode active material layer)/(a copper foil). Flexibility, powder fall property and moisture amount of the obtained negative electrode with porous membrane were evaluated. Results are shown in Table 1.

Instead of an organic separator with porous membrane obtained in step (8) of Example 1, an organic separator (a polypropylene made separator with a single layer having a porosity of 55% and a thickness of 25 μm, the same with the organic separator used in step (8) of Example 1).

Further, the same processes as in Example 1 were performed, except the above-described negative electrode with porous membrane was used instead of negative electrode obtained in step (7) of Example 1; and a secondary battery was obtained and evaluated. Results are shown in Table 1. Note that when setting a negative electrode with porous membrane inside a packaging container, its porous membrane side surface faced the organic separator side, while its copper foil side faced the upper side.

Example 15

<Manufacturing NMP Dispersion of Non-Conductive Particles>

200 parts of N-methyl-2-pyrolidone (NMP) was added to 100 parts of water dispersion of non-conductive particles obtained in step (3) of Example 1 (solid content concentration was 20%), sufficiently stirred, and water and NMP within the system were removed in a reduced-pressure environment at 90° C.; subsequently obtaining NMP dispersion (solid content concentration was 20%) of non-conductive particles.

<Manufacturing NMP Dispersion of a Binder>

760 parts of NMP was added to 100 parts of water dispersion of binder for a porous membrane obtained in step (4) of Example 1 (solid content concentration was 40%), sufficiently stirred, and water and NMP within the system were removed in a reduced-pressure environment at 90° C.; subsequently obtaining NMP dispersion (solid content was 10%) of binder for a porous membrane.

<Manufacturing a Porous Membrane Slurry>

NMP dispersion of non-conductive particles and the same of a binder for porous membrane, respectively obtained by the above steps, were mixed so that its solid content ratio becomes 87:13; and a porous membrane slurry having 18% solid content concentration was obtained.

<Manufacturing Negative Electrode with Porous Membrane>

A porous membrane slurry obtained in the above step was coated on a surface of negative electrode active material layer side of the negative electrode obtained in step (7) of Example 1, in order to make the negative electrode active material layer completely covered and a thickness of dried porous membrane to 5 μm; and a slurry layer was obtained. The slurry layer was dried at 100° C. for 10 minutes, a porous membrane was formed; and negative electrode with porous membrane was obtained. The obtained negative electrode with porous membrane had a layer composition of (a porous membrane)/(a negative electrode active material layer)/(a copper foil). Flexibility, powder fall property and moisture amount of the obtained negative electrode with porous membrane were evaluated. Results are shown in Table 1.

<Manufacturing a Secondary Battery Having Negative Electrode with Porous Membrane>

Instead of an organic separator with porous membrane obtained in step (8) of Example 1, an organic separator (a polypropylene made separator with a single layer having a porosity of 55% and a thickness of 25 μm, the same with the organic separator used in step (8) of Example 1).

Further, the same processes as in Example 1 were performed, except the above-described negative electrode with porous membrane was used instead of negative electrode obtained in step (7) of Example 1; and a secondary battery was obtained and evaluated. Results are shown in Table 1. Note that when setting a negative electrode with porous membrane inside a packaging container, its porous membrane side surface faced the organic separator side, while its copper foil side faced the upper side.

Comparative Example 1

The same procedures were performed as in Example 1, except manufacturing a porous membrane slurry using the binder for porous membrane, instead of a binder for porous membrane obtained in step (4) in Example 1; and an organic separator with porous membrane and a secondary battery were obtained and evaluated. Results are shown in Table 1.

<Manufacturing a Binder>

70 parts of ion-exchange water, 0.4 parts of sodium dodecylbenzenesulfonate and 0.3 parts of potassium persulfate were added to a reactor vessel with stirrer, and mixed to obtain a mixture; and then its temperature was raised to 60° C.

On the other hand, 50 parts of ion-exchange water, 0.8 parts of sodium dodecylbenzenesulfonate, 79 parts of 2-ethylhexyl acrylate and 21 parts of acrylonitril were mixed to obtain monomer mixture.

This monomer mixture was constantly added to the above-described mixture for 4 hours. Temperature of reaction system during the constant addition, was maintained at 60° C.; and the reaction was progressed. After the constant addition, the reaction was continuously progressed for 3 hours at 70° C.; and aqueous dispersion including binder (binder aqueous dispersion) was obtained.

After cooling the obtained binder aqueous dispersion to 25° C., aqueous ammonia was added to the same and its pH was adjusted to 7, then unreacted monomers were removed by introducing steam. Subsequently and promptly, 0.25 parts of ethylenediaminetetraacetate was added with respect to 100 parts of binder solid content, mixed thereof, and filtrated thereof with a stainless-steel metallic mesh of 200 mesh (aperture size of around 77 μm), while further performing solid content density adjustment with ion-exchange water. Then, a binder aqueous dispersion for porous membrane, having an average particle diameter of 100 nm and solid content concentration of 40%, was obtained.

In said binder for porous membrane, polymerized unit content ratio of vinyl monomer having hydrophilic acid group was 0%, the same of (meth)acrylic ester monomer was 79%, and the same of α,β-unsaturated nitrile monomer was 21%.

Comparative Example 2

The same procedures were performed as in Example 1, except the following non-conductive organic particles were used, instead of non-conductive organic particles obtained in steps (1) to (3), to make a porous membrane slurry; and an organic separator with porous membrane and a secondary battery were obtained and evaluated. Results are shown in Table 1.

<Manufacturing Non-Conductive Organic Particles>

Next, 10 parts of water dispersion of seed polymer particles B, obtained in the above step (2) by solid content standard (i.e. weight standard of seed polymer particles B), 90 parts of monomer mixture (mixture of divinylbenzen and ethylvinyl benzene, monomer mixture ratio: divinylbenzen/ethylvinyl benzene=60/40, New Nippon Steel Chemical Co., Ltd. made, product name: DVB-570), 1.0 part of sodium dodecylbenzenesulfonate, 5.0 parts of t-butyl peroxy-2-ethylhexanoate (Nippon Oil & Fats Co., Ltd., product name: perbutyl O) as polymeric initiator and 200 parts of ion-exchange water were added to reactor vessel with stirrer, stirred for 12 hours at 35° C.; and monomer mixture and polymeric initiator was completely absorbed to seed polymer particles B. Next, the above was polymerized for 4 hours at 90° C. Subsequently, unreacted monomer was removed by introducing steam.

With this, water dispersion of non-conductive organic particle having an average particle diameter of 0.4 μm was obtained.

Monomer (styrene, methacrylic acid, divinylbenzen and ethylvinyl benzene) compositions used from formation of seed polymer particles to obtaining non-conductive organic particles, heat resistant temperatures (T10 value) of non-conductive organic particles, contents of functional groups and metallic foreign particle contents are shown in Table 1.

Comparative Example 3

The same procedures were performed as in Example 14, except the porous membrane slurry of comparative example 2 was used; and negative electrode with porous membrane and a secondary battery were obtained and evaluated. Results are shown in Table 1.

Comparative Example 4

The same procedures were performed as in Example 1, except a porous membrane slurry was manufactured using the following binder for a porous membrane instead of the binder for a porous membrane obtained in step (4) of example 1; and an organic separator with porous membrane and a secondary battery were obtained and evaluated. Results are shown in Table 1.
<Manufacturing a Binder>
5 parts of styrene, 10 parts of butadiene, 3 parts of polyoxyethylene alkyl ether (Kao Corporation made: Emulgen 1150S-60) and 70 parts of ion-exchange water were added to polymerization tank A and sufficiently stirred. Then, temperature was set at 70° C., 0.3 parts of water-soluble azo polymeric initiator (Wako Pure Chemical Industries, Ltd. made: VA-086) as polymeric initiator and 10 parts of ion-exchange water were added, and stirred for 120 minutes.

On the other hand, 47 parts of styrene, 38 parts of butadiene, 10 parts of polyoxyethylene alkyl ether and 30 parts of ion-exchange water were added to the other polymerization tank B and stirred to manufacture an emulsion.

Then, the manufactured emulsion was continuously added from polymerization tank B to polymerization tank A for about 300 minutes, and stirred for 180 minutes; and it was cooled when monomer consumption became 95%, which lead to a completion of the reaction. With this, a binder aqueous dispersion of binder for a porous membrane having a solid content concentration of 40% and a number average particle diameter of 150 nm was obtained.

Vinyl monomer having hydrophilic acid group, the same of (meth)acrylic ester monomer and the same of α,β-unsaturated nitrile monomer were all 0%.

Comparative Example 5

The same procedures were performed as in Example 1, except a porous membrane slurry was manufactured using Sumitomo Chemical Co., Ltd. made Alumina AKP-50 (average particle diameter of 0.3 μm) instead of non-conductive organic particles obtained in steps (1) to (3) of Example 1; and an organic separator with porous membrane and a secondary battery were obtained and evaluated. Results are shown in Table 1.

TABLE 1

| | Unit | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Binder (Composition) | | | | | | | | | | | |
| 2EHA | wt % | 77.7 | 78.4 | 76.5 | 91 | 67 | 78 | 78.5 | 77.9 | 77.7 | 77.7 |
| AN | wt % | 20 | 21 | 19 | 7 | 30 | 20.2 | 20.6 | 20.1 | 20 | 20 |
| ST | wt % | | | | | | | | | | |
| BD | wt % | | | | | | | | | | |
| AMPS | wt % | 2.3 | 0.6 | 4.5 | 2 | 3 | | | | 2.3 | 2.3 |
| Styrene Sulfonate | wt % | | | | | | 1.8 | | | | |
| Meta-Allylsulphonate | wt % | | | | | | | 0.9 | | | |
| Phosphate-2-(meth)acryloyloxyethyl | wt % | | | | | | | | 2 | | |
| Non-Conductive Organic Particles (Composition) | wt % | | | | | | | | | | |
| ST | wt % | 9.7 | 9.7 | 9.7 | 9.7 | 9.7 | 9.7 | 9.7 | 9.7 | 9.7 | 9.7 |
| MAA | wt % | 0.3 | 0.3 | 0.3 | 0.3 | 0.3 | 0.3 | 0.3 | 0.3 | 0.3 | 0.3 |
| DVB | wt % | 53.1 | 53.8 | 52.3 | 53.1 | 53.1 | 53.1 | 53.1 | 53.1 | 53.4 | 53.0 |
| EVB | wt % | 35.4 | 35.8 | 34.9 | 35.4 | 35.4 | 35.4 | 35.4 | 35.4 | 35.6 | 35.3 |
| GMA | wt % | 1.5 | 0.4 | 2.8 | 1.5 | 1.5 | 1.5 | 1.5 | 1.5 | | |
| AGE | wt % | | | | | | | | | 1 | |
| 3-methacryloxy-triethoxysilan | wt % | | | | | | | | | | 1.7 |
| Non-Conductive Organic Particles (Physical Properties) | | | | | | | | | | | |
| Heat-Resistant Temperature (T10 Value) | ° C. | 380 | 380 | 380 | 380 | 380 | 380 | 380 | 380 | 380 | 380 |
| Functional group content, cross-linkable with hydrophilic acid group | mmol/g | 0.106 | 0.028 | 0.197 | 0.106 | 0.106 | 0.106 | 0.106 | 0.106 | 0.088 | 0.068 |
| Evaluation items | | | | | | | | | | | |
| Flexibility and Powder Fall Property of Electrode or Separator for Secondary Battery | | A | B | A | B | B | B | B | C | B | C |
| Cycle Characteristic of Secondary Battery | | A | A | B | A | A | A | A | B | C | C |
| Moisture amount of a Secondary Battery Porous Membrane | | A | A | A | B | A | A | A | A | A | B |
| Metallic Foreign Particle Content of Non-Conductive Organic Particles | | A | A | A | A | A | A | A | A | A | A |

TABLE 1-continued

|  | Ex. 11 | Ex. 12 | Ex. 13 | Ex. 14 | Ex. 15 | Comp. Ex. 1 | Comp. Ex. 2 | Comp. Ex. 3 | Comp. Ex. 4 | Comp. Ex. 5 |
|---|---|---|---|---|---|---|---|---|---|---|
| Binder (Composition) |  |  |  |  |  |  |  |  |  |  |
| 2EHA | 77.7 | 75 |  | 77.7 | 77.7 | 79 | 77.7 | 77.7 |  | 77.7 |
| AN | 20 | 17 |  | 20 | 20 | 21 | 20 | 20 |  | 20 |
| ST |  |  | 50.8 |  |  |  |  |  | 52 |  |
| BD |  |  | 46.9 |  |  |  |  |  | 48 |  |
| AMPS | 2.3 | 8 | 2.3 | 2.3 | 2.3 |  | 2.3 | 2.3 |  | 2.3 |
| Styrene Sulfonate |  |  |  |  |  |  |  |  |  |  |
| Meta-Allylsulphonate |  |  |  |  |  |  |  |  |  |  |
| Phosphate-2-(meth)acryloyloxyethyl |  |  |  |  |  |  |  |  |  |  |
| Non-Conductive Organic Particles (Composition) |  |  |  |  |  |  |  |  |  |  |
| ST | 9.7 | 9.7 | 9.7 | 9.7 | 9.7 | 9.7 | 9.7 | 9.7 | 9.7 | — |
| MAA | 0.3 | 0.3 | 0.3 | 0.3 | 0.3 | 0.3 | 0.3 | 0.3 | 0.3 | — |
| DVB | 51.4 | 53.1 | 53.1 | 53.1 | 53.1 | 53.1 | 54 | 54 | 53.1 | — |
| EVB | 34.3 | 35.4 | 35.4 | 35.4 | 35.4 | 35.4 | 36 | 36 | 35.4 | — |
| GMA | 4.3 | 1.5 | 1.5 | 1.5 | 1.5 | 1.5 |  |  | 1.5 | — |
| AGE |  |  |  |  |  |  |  |  |  | — |
| 3-methacryloxy-triethoxysilan |  |  |  |  |  |  |  |  |  |  |
| Non-Conductive Organic Particles (Physical Properties) |  |  |  |  |  |  |  |  |  |  |
| Heat-Resistant Temperature (T10 Value) | 380 | 380 | 380 | 380 | 380 | 380 | 380 | 380 | 380 | — |
| Functional group content, cross-linkable with hydrophilic acid group | 0.070 | 0.106 | 0.106 | 0.106 | 0.106 | 0.106 | — | — | 0.106 | — |
| Evaluation items |  |  |  |  |  |  |  |  |  |  |
| Flexibility and Powder Fall Property of Electrode or Separator for Secondary Battery | B | B | C | B | A | E | D | E | E | E |
| Cycle Characteristic of Secondary Battery | C | C | C | A | A | D | E | E | D | E |
| Moisture amount of a Secondary Battery Porous Membrane | B | B | A | A | A | A | A | A | A | D |
| Metallic Foreign Particle Content of Non-Conductive Organic Particles | A | A | A | A | A | A | A | A | A | D |

2EHA: 2-ethylhexyl acrylate
AN: acrylonitril
ST: styrene
BD: butadiene
AMPS: 2-acrylamide-2-methylpropanesulfonic
MAA: methacrylic acid
DVB: divinylbenzen
EVB: ethylvinyl benzene
GMA: glycidyl methacrylate
AGE: allylglycidylether The followings can be observed from Table 1.

The secondary battery separator and the secondary battery electrode having the secondary battery porous membrane formed by using a slurry for secondary battery porous membrane (Examples 1 to 15) including a binder, comprising a polymerized unit of vinyl monomer having a hydrophilic acid group, and non-conductive organic particles having a functional group which is cross-linkable with said hydrophilic acid group are superior in their flexibility and powder fall property. Further, moisture amount included in the porous membrane is less, and that metal content is less. As a result, side reactions in the secondary battery are prevented, and battery properties, such as a cycle characteristic, can be improved. Above all, the secondary battery separator and the secondary battery electrode having secondary battery porous membrane formed by using a slurry for secondary battery porous membrane (Examples 1 to 7, 14 and 15) including a binder, having sulfonic acid group as a hydrophilic acid group, and non-conductive organic particles, having an epoxy group as a functional group which is cross-linkable with said hydrophilic acid group, are particularly superior in their flexibility and powder fall property, and show superior cycle characteristic since moisture and metal contents in a porous membrane is less.

On the other hand, when a binder without hydrophilic acid group (comparative examples 1 and 4), non-conductive organic particles without functional groups which is cross-linkable with hydrophilic acid group (comparative examples 2 and 3) or inorganic particles (Alumina) instead of non-conductive organic particles (comparative example 5) are used, their secondary battery separators and secondary battery electrodes show inferior flexibility and powder fall property, followed by poor cycle characteristic. Note that, when inorganic particles (Alumina) instead of non-conductive organic particles are used (comparative example 5), moisture amount is excessively included in a porous membrane and metallic foreign particles content are further excessive; and that its cycle characteristic is particularly deteriorated.

The invention claimed is:

1. A slurry for a secondary battery porous membrane comprising:
  a binder including a polymerized unit of vinyl monomer having a hydrophilic acid group;
  a non-conductive organic particle having a functional group, which is cross-linkable with the hydrophilic acid group; and
  a solvent, wherein:
the non-conductive organic particle includes a polymerized unit of divinylbenzene and a polymerized unit of ethylvinyl benzene, and
a content of the functional group which is cross-linkable with the hydrophilic acid group, with respect to the non-conductive organic particle, is 0.068 to 0.240 mmol/g.

2. The slurry for secondary battery porous membrane as set forth in claim 1, wherein the binder further includes a polymerized unit of (meth)acrylic ester monomer and a polymerized unit of α, β-unsaturated nitrile monomer;
and in a total polymerized unit,
a content ratio of the polymerized unit of vinyl monomer having a hydrophilic acid group is 0.1 to 10 wt %,
a content ratio of the polymerized unit of (meth)acrylic ester monomer is 50 to 98 wt %, and
a content ratio of the polymerized unit of α, β-unsaturated nitrile monomer is 1.0 to 50 wt %.

3. The slurry for secondary battery porous membrane as set forth in claim 1, wherein the hydrophilic acid group is a sulfonic acid group or a phosphoric acid group.

4. The slurry for secondary battery porous membrane as set forth in claim 1, wherein the functional group, which is cross-linkable with the hydrophilic acid group, is an epoxy group or an alkoxysilane group.

5. The slurry for secondary battery porous membrane as set forth in claim 1, wherein:
an average particle diameter of the non-conductive organic particle is 0.1 to 2.0 μm, and a temperature in which a weight reduction ratio of the non-conductive organic particle reaches 10 wt % is 250° C. or more, when heated from 30 ° C. at a temperature rising rate of 10° C/min. by a thermobalance under a nitrogen atmosphere.

6. A secondary battery porous membrane obtained by forming a membrane with the slurry for secondary battery porous membrane as set forth in claim 1 and drying the same.

7. A secondary battery porous membrane comprising:
a binder, including a polymerized unit of vinyl monomer having a hydrophilic acid group; and
a non-conductive organic particle having a functional group, which is cross-linkable with the hydrophilic acid group;
wherein:
a cross-linkage structure is formed between the binder and the non-conductive organic particle,
the non-conductive organic particle includes a polymerized unit of divinylbenzene and a pglymerized unit of ethylvinyl benzene, and
a content of the functional group which is cross-linkable with the hydrophilic acid group, with respect to the non-conductive organic particle, is 0.068 to 0.240 mmol/g.

8. An electrode for secondary battery comprising
a current collector,
an electrode active material layer, including an electrode active material and a binder for electrode, which is adhered to the current collector, and
the secondary battery porous membrane as set forth in claim 6, stacked on a surface of the electrode active material layer.

9. A separator for secondary battery comprising an organic separator and the secondary battery porous membrane as set forth in claim 6, stacked on the organic separator.

10. A secondary battery comprising a positive electrode, a negative electrode, an organic separator and an electrolytic solution, wherein the secondary battery porous membrane as set forth in claim 6 is stacked on one of the positive electrode, the negative electrode or the organic separator.

11. The slurry for secondary battery porous membrane as set forth in claim 2, wherein the hydrophilic acid group is a sulfonic acid group or a phosphoric acid group.

12. The slurry for secondary battery porous membrane as set forth in claim 2, wherein the functional group, which is cross-linkable with the hydrophilic acid group, is an epoxy group or an alkoxysilane group.

13. The slurry for secondary battery porous membrane as set forth in claim 3, wherein the functional group, which is cross-linkable with the hydrophilic acid group, is an epoxy group or an alkoxysilane group.

14. The slurry for secondary battery porous membrane as set forth in claim 2, wherein:
an average particle diameter of the non-conductive organic particle is 0.1 to 2.0 μm, and a temperature in which a weight reduction ratio of the non-conductive organic particle reaches 10 wt % is 250° C. or more, when heated from 30° C. at a temperature rising rate of 10° C/min. by a thermobalance under a nitrogen atmosphere.

15. The slurry for secondary battery porous membrane as set forth in claim 3, wherein:
an average particle diameter of the non-conductive organic particle is 0.1 to 2.0 μm, and a temperature in which a weight reduction ratio of the non-conductive organic particle reaches 10 wt % is 250 ° C. or more, when heated from 30 ° C. at a temperature rising rate of 10° C/min. by a thermobalance under a nitrogen atmosphere.

16. The slurry for secondary battery porous membrane as set forth in claim 4, wherein:
an average particle diameter of the non-conductive organic particle is 0.1 to 2.0 μm, and a temperature in which a weight reduction ratio of the non-conductive organic particle reaches 10 wt % is 250 ° C. or more, when heated from 30 ° C. at a temperature rising rate of 10° C/min. by a thermobalance under a nitrogen atmosphere.

17. The slurry for a secondary battery porous membrane as set forth in claim 1, wherein a content ratio of the polymerized unit of divinylbenzene with respect to a total weight of a monomer in the non-conductive organic particle is 20 wt % to 80 wt %.

18. The slurry for a secondary battery porous membrane as set forth in claim 1, wherein a content ratio of the polymerized unit of ethylvinyl benzene with respect to a total weight of a monomer in the non-conductive organic particle is 3.2 wt % to 48 wt %.

19. The secondary battery porous membrane as set forth in claim 7, wherein a content ratio of the polymerized unit of ethylvinyl benzene with respect to a total weight of a monomer in the non-conductive organic particle is 3.2 wt % to 48 wt %.

* * * * *